United States Patent
Sirotkin et al.

(10) Patent No.: US 10,271,314 B2
(45) Date of Patent: Apr. 23, 2019

(54) APPARATUS, SYSTEM AND METHOD OF USER-EQUIPMENT (UE) CENTRIC TRAFFIC ROUTING

(71) Applicant: INTEL IP CORPORATION, Santa Clara, CA (US)

(72) Inventors: Alexander Sirotkin, Giv'on Hachadasha (IL); Hyung-Nam Choi, Hamburg (DE); Nageen Himayat, Fremont, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/772,495

(22) PCT Filed: Dec. 27, 2013

(86) PCT No.: PCT/US2013/077905
§ 371 (c)(1),
(2) Date: Sep. 3, 2015

(87) PCT Pub. No.: WO2014/163696
PCT Pub. Date: Oct. 9, 2014

(65) Prior Publication Data
US 2016/0020890 A1    Jan. 21, 2016

Related U.S. Application Data

(60) Provisional application No. 61/808,597, filed on Apr. 4, 2013.

(51) Int. Cl.
*H04W 72/04*    (2009.01)
*H04W 76/10*    (2018.01)
(Continued)

(52) U.S. Cl.
CPC .......... *H04W 72/0413* (2013.01); *H04B 1/38* (2013.01); *H04B 7/024* (2013.01);
(Continued)

(58) Field of Classification Search
CPC .................................................. H04W 72/0413
See application file for complete search history.

(56) References Cited

U.S. PATENT DOCUMENTS

| 7,212,837 B1 | 5/2007 | Calhoun et al. |
| 7,965,693 B2 | 6/2011 | Jiang et al. |

(Continued)

FOREIGN PATENT DOCUMENTS

| CN | 1674689 | 9/2005 |
| CN | 1954626 | 4/2007 |

(Continued)

OTHER PUBLICATIONS

Office Action for Korean Patent Application Serial No. 2015-7015916, dated Mar. 24, 2016, 12 pages.(Including 6 pages of English translation.).

(Continued)

*Primary Examiner* — Jenee Holland
(74) *Attorney, Agent, or Firm* — Shichrur & Co.

(57) ABSTRACT

Some demonstrative embodiments include devices, systems of User Equipment (UE) centric access network selection. For example, a node B may transmit to a User Equipment (UE) a cellular communication message over a cellular communication medium, the message including a value of a predefined parameter, which is based on a cellular network load of a cellular network.

26 Claims, 2 Drawing Sheets

(51) Int. Cl.

| | | |
|---|---|---|
| H04W 76/11 | (2018.01) | |
| H04W 76/38 | (2018.01) | |
| H04W 76/15 | (2018.01) | |
| H04W 76/27 | (2018.01) | |
| H04W 76/30 | (2018.01) | |
| H04W 76/12 | (2018.01) | |
| H04W 4/70 | (2018.01) | |
| H04W 76/22 | (2018.01) | |
| H04L 5/00 | (2006.01) | |
| H04B 7/024 | (2017.01) | |
| H04W 24/02 | (2009.01) | |
| H04W 74/08 | (2009.01) | |
| H04W 36/30 | (2009.01) | |
| H04B 1/38 | (2015.01) | |
| H04W 76/00 | (2018.01) | |
| H04W 24/08 | (2009.01) | |
| H04L 12/26 | (2006.01) | |
| H04W 68/02 | (2009.01) | |
| H04L 12/18 | (2006.01) | |
| H04L 29/06 | (2006.01) | |
| H04L 29/08 | (2006.01) | |
| H04W 8/00 | (2009.01) | |
| H04W 56/00 | (2009.01) | |
| H04W 72/12 | (2009.01) | |
| H04L 5/14 | (2006.01) | |
| H04W 36/00 | (2009.01) | |
| H04L 1/18 | (2006.01) | |
| H04W 76/28 | (2018.01) | |
| H04B 7/0456 | (2017.01) | |
| H04B 7/06 | (2006.01) | |
| H04W 84/12 | (2009.01) | |
| H04W 84/04 | (2009.01) | |
| H04W 88/02 | (2009.01) | |
| H04W 92/20 | (2009.01) | |
| H04W 88/08 | (2009.01) | |
| H04W 36/38 | (2009.01) | |
| H04W 36/14 | (2009.01) | |
| H04W 36/36 | (2009.01) | |
| H04W 76/20 | (2018.01) | |
| H04W 88/06 | (2009.01) | |

(52) U.S. Cl.
CPC .......... *H04L 1/1854* (2013.01); *H04L 5/0053* (2013.01); *H04L 5/0055* (2013.01); *H04L 5/0094* (2013.01); *H04L 5/14* (2013.01); *H04L 12/18* (2013.01); *H04L 43/0823* (2013.01); *H04L 65/1016* (2013.01); *H04L 65/4076* (2013.01); *H04L 65/4092* (2013.01); *H04L 67/02* (2013.01); *H04L 67/1076* (2013.01); *H04W 4/70* (2018.02); *H04W 8/005* (2013.01); *H04W 24/02* (2013.01); *H04W 24/08* (2013.01); *H04W 36/0088* (2013.01); *H04W 36/0094* (2013.01); *H04W 36/30* (2013.01); *H04W 56/001* (2013.01); *H04W 68/02* (2013.01); *H04W 72/042* (2013.01); *H04W 72/048* (2013.01); *H04W 72/0446* (2013.01); *H04W 72/0486* (2013.01); *H04W 72/1215* (2013.01); *H04W 72/1263* (2013.01); *H04W 74/0808* (2013.01); *H04W 76/00* (2013.01); *H04W 76/10* (2018.02); *H04W 76/11* (2018.02); *H04W 76/12* (2018.02); *H04W 76/15* (2018.02); *H04W 76/22* (2018.02); *H04W 76/27* (2018.02); *H04W 76/28* (2018.02); *H04W 76/30* (2018.02); *H04W 76/38* (2018.02); *H04B 7/0456* (2013.01); *H04B 7/0639* (2013.01); *H04L 5/0007* (2013.01); *H04L 65/105* (2013.01); *H04L 65/1006* (2013.01); *H04W 36/14* (2013.01); *H04W 36/36* (2013.01); *H04W 36/38* (2013.01); *H04W 76/20* (2018.02); *H04W 84/045* (2013.01); *H04W 84/12* (2013.01); *H04W 88/02* (2013.01); *H04W 88/06* (2013.01); *H04W 88/08* (2013.01); *H04W 92/20* (2013.01); *Y02D 70/124* (2018.01); *Y02D 70/126* (2018.01); *Y02D 70/20* (2018.01)

(56) References Cited

U.S. PATENT DOCUMENTS

| | | | |
|---|---|---|---|
| 8,112,087 | B2 | 2/2012 | Jeong et al. |
| 8,467,351 | B2 | 6/2013 | Liu et al. |
| 8,774,039 | B2 | 7/2014 | Hirano et al. |
| 8,842,633 | B2 | 9/2014 | Dwyer et al. |
| 8,918,096 | B2 | 12/2014 | Drazynski et al. |
| 9,294,926 | B2 | 3/2016 | Pragada et al. |
| 9,414,392 | B2 | 8/2016 | Sirotkin |
| 2003/0202496 | A1* | 10/2003 | Kluge ............ H03G 3/001 370/338 |
| 2004/0082327 | A1 | 4/2004 | Kim et al. |
| 2004/0165563 | A1* | 8/2004 | Hsu ............ H04W 48/18 370/338 |
| 2004/0192222 | A1* | 9/2004 | Vaisanen ............ H04B 1/3805 455/78 |
| 2004/0202140 | A1* | 10/2004 | Kim ............ H04W 72/005 370/335 |
| 2004/0218575 | A1* | 11/2004 | Ibe ............ H04W 36/0011 370/338 |
| 2004/0248605 | A1* | 12/2004 | Cao ............ H04W 52/322 455/522 |
| 2005/0153692 | A1 | 7/2005 | Hwang et al. |
| 2005/0164719 | A1* | 7/2005 | Waters ............ H04W 68/00 455/458 |
| 2005/0202823 | A1 | 9/2005 | Shaheen et al. |
| 2005/0210154 | A1 | 9/2005 | Verma et al. |
| 2005/0254469 | A1 | 11/2005 | Verma et al. |
| 2005/0255851 | A1 | 11/2005 | Schreiber |
| 2006/0018284 | A1 | 1/2006 | Rudolf et al. |
| 2006/0067226 | A1* | 3/2006 | Chandra ............ H04W 24/00 370/235 |
| 2006/0172736 | A1* | 8/2006 | Nevo ............ H04W 48/18 455/435.1 |
| 2006/0189331 | A1 | 8/2006 | Lundsjo et al. |
| 2006/0223567 | A1 | 10/2006 | Kwak et al. |
| 2007/0060067 | A1 | 3/2007 | Ruuska |
| 2007/0097918 | A1 | 5/2007 | Cai et al. |
| 2007/0121561 | A1* | 5/2007 | Yashar ............ H04L 29/06027 370/338 |
| 2007/0218906 | A1* | 9/2007 | Melia ............ H04W 36/30 455/436 |
| 2007/0224988 | A1 | 9/2007 | Shaheen |
| 2007/0265003 | A1* | 11/2007 | Kezys ............ H04L 12/66 455/435.1 |
| 2008/0049694 | A1 | 2/2008 | Kinoshita et al. |
| 2008/0096560 | A1* | 4/2008 | Felske ............ H04W 36/00837 455/436 |
| 2008/0113692 | A1* | 5/2008 | Zhao ............ H04B 15/02 455/574 |
| 2008/0207195 | A1 | 8/2008 | Ranta et al. |
| 2009/0046654 | A1* | 2/2009 | Hoshi ............ H04W 36/0088 370/331 |
| 2009/0061877 | A1 | 3/2009 | Gallagher et al. |
| 2010/0002883 | A1 | 1/2010 | Sammour et al. |
| 2010/0075676 | A1* | 3/2010 | Hyziak ............ H04W 36/30 455/436 |
| 2010/0144363 | A1* | 6/2010 | De Rosa ............ H04W 72/0486 455/452.1 |
| 2010/0228980 | A1 | 9/2010 | Falk et al. |
| 2010/0317315 | A1 | 12/2010 | Burbidge et al. |

(56) References Cited

U.S. PATENT DOCUMENTS

| | | |
|---|---|---|
| 2010/0323698 A1 | 12/2010 | Rune et al. |
| 2011/0053523 A1* | 3/2011 | Yeh .................. H04B 1/406 |
| | | 455/73 |
| 2011/0058531 A1 | 3/2011 | Jain et al. |
| 2011/0105112 A1 | 5/2011 | Cave et al. |
| 2011/0176414 A1 | 7/2011 | Dr Franca Lima et al. |
| 2011/0188472 A1 | 8/2011 | Jeon et al. |
| 2011/0222523 A1* | 9/2011 | Fu .................... H04W 36/22 |
| | | 370/338 |
| 2011/0306386 A1 | 12/2011 | Centoza et al. |
| 2012/0015657 A1 | 1/2012 | Comsa et al. |
| 2012/0017257 A1* | 1/2012 | Lee .................. G09G 5/006 |
| | | 725/153 |
| 2012/0033568 A1* | 2/2012 | Park .................. H04W 76/14 |
| | | 370/252 |
| 2012/0100853 A1 | 4/2012 | Xiong et al. |
| 2012/0113843 A1 | 5/2012 | Watta et al. |
| 2012/0284785 A1 | 11/2012 | Salkintzis et al. |
| 2012/0294215 A1 | 11/2012 | Ekici et al. |
| 2012/0295624 A1* | 11/2012 | Tang .................. H04L 61/2514 |
| | | 455/436 |
| 2012/0300759 A1 | 11/2012 | Patanapongpibul et al. |
| 2012/0308007 A1 | 12/2012 | Li et al. |
| 2012/0315905 A1* | 12/2012 | Zhu .................... H04W 36/36 |
| | | 455/436 |
| 2013/0021929 A1 | 1/2013 | Kim |
| 2013/0083661 A1* | 4/2013 | Gupta ............... H04W 28/0215 |
| | | 370/235 |
| 2013/0083722 A1 | 4/2013 | Bhargava et al. |
| 2013/0083783 A1 | 4/2013 | Gupta et al. |
| 2013/0095789 A1 | 4/2013 | Keevill et al. |
| 2013/0137454 A1 | 5/2013 | Cui et al. |
| 2013/0163424 A1 | 6/2013 | Goerke et al. |
| 2013/0163463 A1 | 6/2013 | Grayson et al. |
| 2013/0229930 A1* | 9/2013 | Akay ............... H04W 52/0245 |
| | | 370/252 |
| 2013/0242965 A1 | 9/2013 | Horn et al. |
| 2013/0250834 A1 | 9/2013 | Seok et al. |
| 2013/0294265 A1* | 11/2013 | Peng .................. G01S 5/0215 |
| | | 370/252 |
| 2013/0308445 A1 | 11/2013 | Xiang et al. |
| 2013/0322238 A1 | 12/2013 | Sirotkin |
| 2014/0003239 A1* | 1/2014 | Etemad .............. H04W 28/08 |
| | | 370/235 |
| 2014/0036874 A1 | 2/2014 | Jeong et al. |
| 2014/0043966 A1* | 2/2014 | Lee .................... H04W 28/08 |
| | | 370/230 |
| 2014/0050086 A1 | 2/2014 | Himayat et al. |
| 2014/0066054 A1* | 3/2014 | Jung .................. H04W 36/14 |
| | | 455/426.1 |
| 2014/0092742 A1* | 4/2014 | Chou ................ H04W 52/0258 |
| | | 370/235 |
| 2014/0112170 A1 | 4/2014 | Zhou et al. |
| 2014/0133294 A1 | 5/2014 | Horn et al. |
| 2014/0133304 A1 | 5/2014 | Pica et al. |
| 2014/0141785 A1 | 5/2014 | Wang et al. |
| 2014/0153511 A1 | 6/2014 | Sirotkin |
| 2014/0161103 A1 | 6/2014 | Sirotkin et al. |
| 2014/0181904 A1 | 6/2014 | Craig et al. |
| 2014/0199996 A1* | 7/2014 | Wang ................ H04W 36/14 |
| | | 455/426.1 |
| 2014/0200008 A1* | 7/2014 | Wang ................ H04W 36/22 |
| | | 455/438 |
| 2014/0302853 A1* | 10/2014 | Militano ............ H04W 36/0055 |
| | | 455/436 |
| 2014/0351887 A1 | 11/2014 | Liu |
| 2015/0350988 A1 | 12/2015 | Himayat et al. |
| 2015/0382281 A1 | 12/2015 | Sirotkin |
| 2016/0014667 A1 | 1/2016 | Sirotkin et al. |
| 2016/0142163 A1 | 5/2016 | Sirotkin |
| 2017/0332291 A1 | 11/2017 | Sirotkin et al. |
| 2018/0020383 A1 | 1/2018 | Sirotkin et al. |

FOREIGN PATENT DOCUMENTS

| | | |
|---|---|---|
| CN | 101015221 | 8/2007 |
| CN | 102318237 | 1/2012 |
| CN | 101167392 | 6/2012 |
| CN | 102595405 | 7/2012 |
| CN | 102714812 | 10/2012 |
| EP | 1753253 | 2/2007 |
| EP | 2389030 | 11/2011 |
| JP | 2005184824 | 7/2005 |
| JP | 2006014076 | 1/2006 |
| JP | 2011015327 | 1/2011 |
| JP | 2013522986 | 6/2013 |
| KR | 20060084002 | 7/2006 |
| KR | 20110126913 | 11/2011 |
| KR | 20120005508 | 1/2012 |
| TW | 200723922 | 6/2007 |
| TW | 201146046 | 12/2011 |
| WO | 2006031159 | 3/2006 |
| WO | 2008084621 | 7/2008 |
| WO | 20110110108 | 9/2011 |
| WO | 2012121757 | 9/2012 |
| WO | 2016143560 | 9/2016 |

OTHER PUBLICATIONS

Notice of Allowance for U.S. Appl. No. 14/093,476, dated Mar. 28, 2016, 30 pages.
Office Action for U.S. Appl. No. 14/129,295, dated Apr. 7, 2016, 14 pages.
Office Action for Japanese Patent Application No. 2015-547932, dated Aug. 9, 2016, 8 pages.(Including 4 pages of English translation.).
European Search Report for European Patent Application No. 13881212.8 dated Sep. 15, 2016, 8 pages.
European Search Report for European Patent Application No. 13872198.0 dated Sep. 22, 2016, 10 pages.
Huawei: "WLAN network selection enhancement", 3GPP Draft; R2-131366 WLAN Network Selection Enhancement, 3rd Generation Partnership Project (3GPP), Mobile Competence Centre ; 650, Route Des Lucioles ; F-06921 Sophia-Antipolis Cedex ; France, vol. RAN WG2, no. Chicago, U.S.A.; Apr. 15, 2013-Apr. 19, 2013, Apr. 5, 2013, 3 pages.
CMCC: "Scenarios and Requirements on WLAN/3GPP Radio Interworking", [Online], 3GPP Draft; R2-130086 Scenarios and Requirements on WLANJ3GPP Radio Interworking, 3rd Generation Partnership Project (3GPP), Mobile Competence Centre ; 650, Route Des Lucioles ; F-06921 Sophiaantipolis Cedex ; France, Jan. 18, 2013, 4 pages.
QUALCOMM Incorporated: "WLAN/3GPP Radio Interworking Scope and Scenarios", [Online] Jan. 18, 2013 (Jan. 18, 2013), 3GPP Draft; R2-130264 WLAN Interworking Scenarios, 3rd Generation Partnership Project (3GPP), Mobile Competence Centre ; 650, Route Des Lucioles ; F-06921 Sophiaantipolis Cedex ; France, Jan. 18, 2013, 3 pages.
LG Electronics Inc: "Comparison of access network selection Solutions", 3GPP Draft; R2-132055 Comparison of Access Network Selection Solutions, 3rd Generation Partnership Project (3GPP), Mobile Competence Centre ; 650, Route Des Lucioles ; F-06921 Sophia-Antipolis Cedex vol. RAN WG2, no. Fukuoka, Japan; May 20, 2013-May 24, 2013, May 11, 2013, 6 pages.
Office Action for Korean Patent Application No. 10-2015-7015916, dated Sep. 26, 2016, 7 pages, (Including pages of English translation).
Extended European Search Report for Patent Application No. 13881363.9, dated Nov. 23, 2016, 14 pages.
Office Action for U.S. Appl. No. 14/068,221, dated Dec. 1, 2016, 30 pages.
"3rd Generation Partnership Project; Technical Specification Group Radio Access Network; UTRAN functions, examples on signalling procedures (Release 11)", 3GPP Draft; 25931-B00, 3rd Generation Partnership Project (3GPP), Mobile Competence Centre ; 650, Route Des Lucioles ; F-06921 Sophia-Antipolis Cedex ; France, Sep. 22, 2012. 130 pages.

(56) References Cited

OTHER PUBLICATIONS

ETRI: "Requirements for WLAN/3GPP radio interworking", 3GPP Draft; R2-130331 Requirements for WLAN-3GPP Radio Interworking (ETRI), 3rd Generation Partnership Project (3GPP), Mobile Competence Centre ; 650, Route Des Lucioles ; F-06921 Sophia-Antipolis Ced j vol. RAN WG2, no. St. Julian; Jan. 28, 2013-Feb. 1, 2013, Jan. 18, 2013, 2 pages.
Office Action for Japanese Patent Application No. 2015-547932, dated Dec. 13, 2016, 7 pages (Including 4 pages of English translation).
Office Action for U.S. Appl. No. 14/129,295, dated Oct. 28, 2015, 18 pages.
Final Office Action for U.S. Appl. No. 14/093,476, dated Oct. 28, 2015, 33 pages.
Office Action for U.S. Appl. No. 14/093,476, dated Jun. 8, 2015, 21 pages.
International Preliminary Report on Patentability for PCT/US2013/077905, dated Oct. 15, 2015, 7 pages.
Office Action for Taiwanese Patent Application No. 103112548, dated May 25, 2015, 12 pages, including 1 page of English translation.
International Search Report and Written Opinion for PCT Patent Application No. PCT/US2013/064761, dated Jan. 20, 2014, 11 pages.
ETSI TS 136 300 V11.3.0 (Nov. 2012), LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11), 217 pages.
ETSI TS 136 331 V10.7.0 (Nov. 2012), LTE; Evolved Universal Terrestrial Radio Access (E-UTRA); Radio Resource Control (RRC); Protocol specification (3GPP TS 36.331 version 10.7.0 Release 10), 307 pages.
3GPP TSG-RAN Meeting #57, RP-1201455, "WLAN/3GPP Radio Interworking", Sep. 13-15, 2012, 5 pages.
3GPP TS 23.401 V10.7.0 (Mar. 2012), 3rd Generation Partnership Project; Technical Specification Group Services and System Aspects; General Packet Radio Service (GPRS) enhancements for Evolved Universal Terrestrial Radio Access Network (E-UTRAN) access (Release 10), 278 pages.
ETSI TS 136 413 V11.1.0 (Oct. 2012), LTE; Evolved Universal Terrestrial Radio Access Network (E-UTRAN); S1 Application Protocol (S1AP) (3GPP TS 36.413 version 11.1.0 Release 11), 270 pages.
3GPP TS 36.423 V11.0.0 (Mar. 2012), 3rd Generation Partnership Project; Technical Specification Group Radio Access Network; Evolved Universal Terrestrial Radio Access Network (E-UTRAN); X2 application protocol (X2AP) (Release 11), 134 pages.
IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
Wi-Fi Alliance Technical Committee P2P Task Group; Wi-Fi Peer-to-Peer (P2P) Technical Specification; Version 1.2; Dec. 14, 2011; 160 pages.
3GPP RWS-120010, "Requirements, Candidate Solutions & Technology Roadmap for LTE Rel-12 Onward," NTT DOCOMO, Inc, Jun. 2012, 27 pages.
3GPP TSG RAN2 Meeting #81, R2-130887, "TR 37.8xx v0.1.0 on Study on WLAN/3GPP Radio Interworking", Feb. 2013, 9 pages.
3GPP TS 25.433 V11.1.0 (Jun. 2012), 3rd Generation Partnership Project; Technical Specification Group Radio Access Network; UTRAN Iub interface Node B Application Part (NBAP) signalling (Release 11), Jun. 2012, 1336 pages.
3GPP TS 25.331 V10.9.0 (Sep. 2012), 3rd Generation Partnership Project; Technical Specification Group Radio Access Network; Radio Resource Control (RRC); Protocol specification (Release 10), Sep. 2012, 1984 pages.
International Search Report and Written Opinion for PCT Patent Application No. PCT/US2013/077905, dated Feb. 28, 2014, 10 pages.
Office Action for U.S. Appl. No. 14/068,221, dated Dec. 22, 2015, 37 pages.
Office Action for U.S. Appl. No. 14/068,221, dated Jun. 2, 2015, 29 pages.
International Preliminary Report on Patentability and Written Opinion for International Application No. PCT/US2013/064761, dated Jul. 30, 2015, 8 pages.
3GPP TS 25.433, Universal Mobile Telecommunications System (UMTS); UTRAN Iub interface Node B Application Part (NBAP) Signaling, version 11.3.0 Release 11, Feb. 2013, 1328 pages.
3GPP TS 25.331: 3rd Generation Partnership Project; Technical Specification Group Radio Access Network; Radio Resource Control (RRC); Protocol specification (Release 10), V10.11.0, Mar. 2013, 1897 pages.
Office Action for Taiwanese Patent Application No. 103112288, dated Nov. 20, 2015, 19 pages, including 9 page of English translation.
International Search Report and Written Opinion for PCT Patent Application No. PCT/US2013/077906, dated Feb. 28, 2014, 10 pages.
International Preliminary Report on Patentability for International Application No. PCT/US2013/077906, dated Oct. 15, 2015, 7 pages.
European Search Report for European Patent Application No. 17169661.0, dated Aug. 9, 2017, 12 pages.
Office Action for Korean Patent Application No. 2017-7005482, dated May 22, 2017, 9 pages (Including 4 pages of English translation).
Office Action for U.S. Appl. No. 15/006,270, dated Jun. 26, 2017, 35 pages.
Office Action for U.S. Appl. No. 14/068,221, dated Nov. 17, 2017, 28 pages.
Office Action for Chinese Patent Application No. 201380073911.0, dated Dec. 7, 2017, 12 pages.
Office Action for U.S. Appl. No. 15/607,607, dated Dec. 27, 2017, 46 pages.
Office Action for U.S. Appl. No. 15/715,463, dated Dec. 28, 2017, 29 pages.
Office Action for U.S. Appl. No. 14/772,523, dated Sep. 22, 2017, 68 pages.
Office Action for Chinese Patent Application No. 201380074064.X dated Feb. 9, 2018, 7 pages.
Office Action for U.S. Appl. No. 15/294,731, dated Jan. 23, 2018, 48 pages.
Office Action for Chinese Patent Application No. 201380066063.0 dated Dec. 29, 2017, 9 pages.
Office Action for Chinese Patent Application No. 201380074064.X, dated Sep. 12, 2018, 6 pages.
Office Action for European Patent Application No. 17169661.0, dated Aug. 3, 2018, 6 pages.
Notice of Allowance for U.S. Appl. No. 15/006,270 dated Aug. 14, 2018, 15 Pages.
Office Action for U.S. Appl. No. 15/294,731, dated Aug. 24, 2018, 41 pages.
Office Action for Japanese Patent Application No. 2017-078767, dated Aug. 14, 2018, 6 pages (Including 3 pages of English translation).
Notice of Allowance for U.S. Appl. No. 15/607,607 dated Sep. 7, 2018, 18 Pages.
Notice of Allowance for U.S. Appl. No. 15/715,463 dated Sep. 7, 2018, 17 Pages.
Office Action for U.S. Appl. No. 15/607,607, dated Jun. 11, 2018, 36 pages.

(56) References Cited

OTHER PUBLICATIONS

Office Action for U.S. Appl. No. 15/715,463, dated Jun. 11, 2018, 58 pages.
Office Action for U.S. Appl. No. 14/068,221, dated Jun. 18, 2018, 41 pages.
Office Action for Chinese Patent Application No. 201380073911.0, dated Aug. 9, 2018, 8 pages.
Office Action for Chinese Patent Application No. 201380066063.0, dated Jul. 30, 2018, 3 pages.
Office Action for Japanese Patent Application No. 2017-078767, dated Apr. 24, 2018, 8 pages (Including 4 pages of English translation).
Office Action for U.S. Appl. No. 14/068,221, dated Dec. 17, 2018, 20 pages.
Notice of Allowance for U.S. Appl. No. 15/294,731, dated Dec. 19, 2018, 29 Pages.

\* cited by examiner

APPARATUS, SYSTEM AND METHOD OF USER-EQUIPMENT (UE) CENTRIC TRAFFIC ROUTING

CROSS REFERENCE

This application is a National Phase Application of PCT/US2013/077905, filed on Dec. 27, 2013, which claims the benefit of and priority from U.S. Provisional Patent Application No. 61/808,597 entitled "Advanced Wireless Communication Systems and Techniques", filed Apr. 4, 2013, the entire disclosures of both of which are incorporated herein by reference.

TECHNICAL FIELD

Some embodiments described herein generally relate to User Equipment (UE) centric traffic routing.

BACKGROUND

A wireless communication device, e.g., a mobile device, may be configured to utilize multiple wireless communication technologies.

For example, a User Equipment (UE) device may be configured to utilize a cellular connection, e.g., a Long Term Evolution (LTE) cellular connection, as well as a wireless-local-area-network (WLAN) connection, e.g., a Wireless-Fidelity (WiFi) connection.

The UE may be configured to automatically utilize a WiFi connection, for example, as long as a Wi-Fi signal received by the UE is strong enough.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
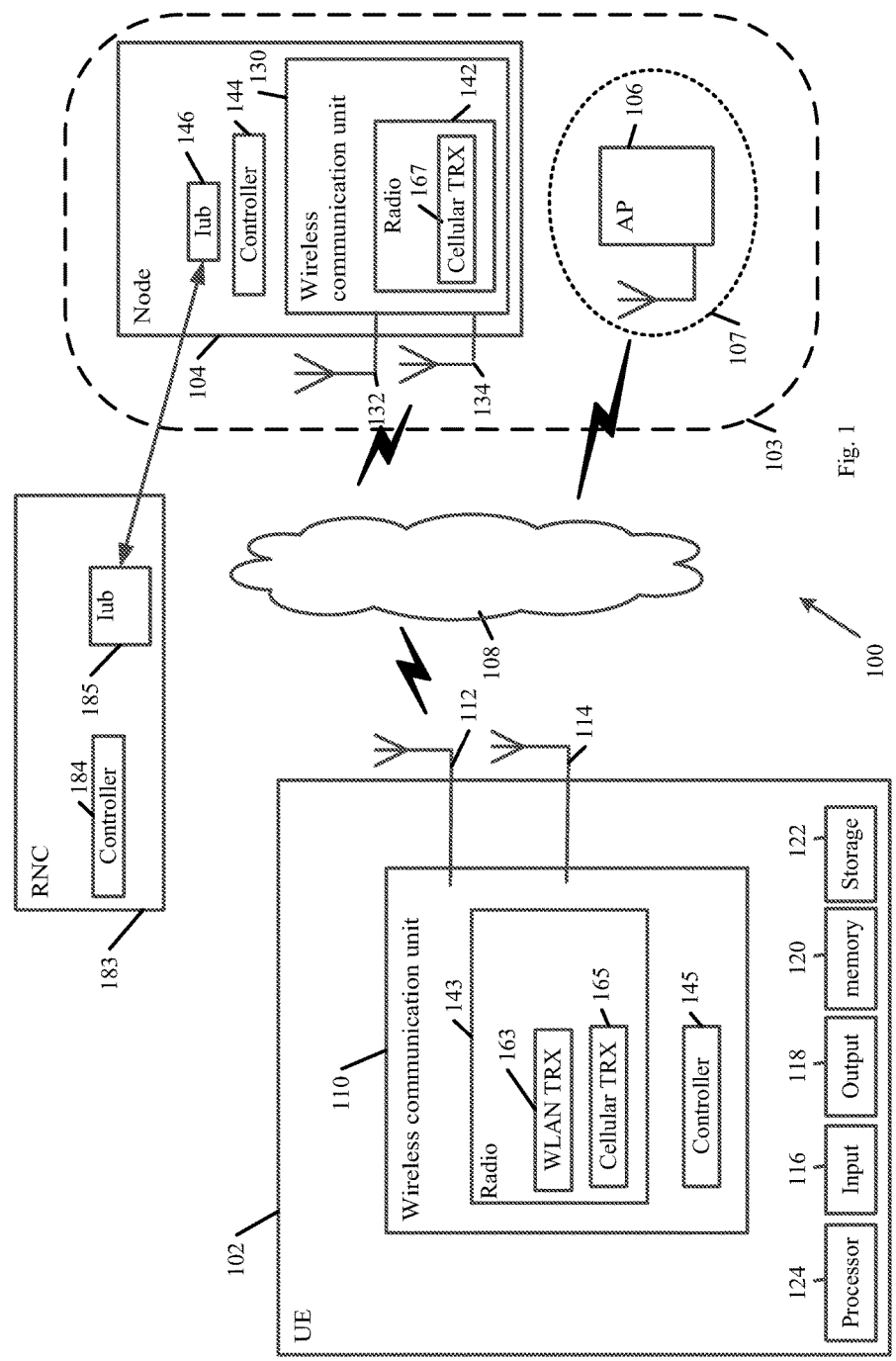
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a cellular network, a cellular node, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing 3rd Generation Partnership Project (3GPP) and/or Long Term Evolution (LTE) specifications (including "3*GPP TS 25.331: 3rd Generation Partnership Project; Technical Specification Group Radio Access Network; Radio Resource Control (RRC); Protocol specification (Release 10), V10.11.0*", March 2013; and "3*GPP TS 25.433, Universal Mobile Telecommunications System (UMTS); UTRAN Iub interface Node B Application Part (NEAP) Signaling, version 11.3.0 Release 11*", February 2013) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1*, April 2011, Final specification) and/or future versions and/or derivatives thereof, devices and/or networks operating in accordance with existing IEEE 802.11 standards (*IEEE*

802.11-2012, *IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012), and/or future versions and/or derivatives thereof, devices and/or networks operating in accordance with existing IEEE 802.16 standards (*IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009*, developed by Task Group m) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments are described herein with respect to a Universal Mobile Telecommunications System (UMTS) cellular system. However, other embodiments may be implemented in any other suitable cellular network, e.g., a 3G cellular network, a 4G cellular network, an LTE network, a 5G cellular network, a WiMax cellular network, and the like.

Some demonstrative embodiments are described herein with respect to a WLAN system. However, other embodiments may be implemented in any other suitable non-cellular network.

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macrocells to small cells, for example, picocells and femtocells.

Other embodiments may be used in conjunction with any other wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

The phrase "access point" (AP), as used herein, may include an entity that includes a station (STA) and provides access to distribution services, via the Wireless Medium (WM) for associated STAs.

The term "station" (STA), as used herein, may include any logical entity that is a singly addressable instance of a medium access control (MAC) and a physical layer (PHY) interface to the WM.

The phrases "directional multi-gigabit (DMG)" and "directional band" (DBand), as used herein, may relate to a frequency band wherein the Channel starting frequency is above 56 GHz.

The phrases "DMG STA" and "mmWave STA (mSTA)" may relate to a STA having a radio transmitter, which is operating on a channel that is within the DMG band.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums 108. For example, system 100 may include at least one User Equipment (UE) 102 capable of communicating with one or more wireless communication networks, e.g., as described below.

Wireless mediums 108 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, system 100 may include at least one cellular network 103, e.g., including a cell controlled by a cellular node ("node") 104.

In some demonstrative embodiments, system 100 may include a non-cellular network 107, for example, a WLAN, e.g., a Basic Service Set (BSS), managed by an Access Point (AP) 106.

In some demonstrative embodiments, non-cellular network 107 may at least partially be within a coverage area of cellular network 103. For example, AP 106 may be within a coverage area of node 104.

In other embodiments, non-cellular network 107 may be outside of the coverage area of cellular network 103. For example, AP 106 may be outside of the coverage area of node 104.

In some demonstrative embodiments, cell 103 may be part of a UMTS and node 104 may include a Node B. For example, node 104 may be configured to communicate directly with UEs within the coverage area of cell 103, e.g., including UE 102. Node 104 may communicate with the UEs, for example, using a Wideband Code Division Multiple Access (WCDMA) and/or Time Division Synchronous Code Division Multiple Access (TD-SCDMA) air interface technology.

In some demonstrative embodiments, node 104 may be controlled by a Radio Network Controller (RNC) 183, form example a UMTS RNC, e.g., as described below.

In some demonstrative embodiments, node 104 may include an Interface, for example, an Interface Unit b (Iub) 146, and RNC 183 may include an Iub 185, to communicate between RNC 183 and node 104.

In some demonstrative embodiments, Iub 185 and Iub 146 may communicate according to a Node-B Application Part (NBAP) signaling protocol.

In other embodiments, node 104 and RNC 183 may communicate via any other interface and/or using any other signaling protocol.

In other embodiments, node 104 and/or RNC 183 may be part of any other cellular network, e.g., a LTE network, node 104 may include any other functionality and/or may perform the functionality of any other cellular node, e.g., an Evolved Node B (eNB), a base station or any other node or device. For example, if node 104 includes an eNB, then at least part of the functionality of RNC 183 may be performed by node 104.

In some demonstrative embodiments, UE 102 may include, for example, a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), a video device, an audio device, an A/V device, a gaming device, a media player, a Smartphone, or the like.

In some demonstrative embodiments, UE 102, node 104 and/or AP 106 may include one or more wireless communication units to perform wireless communication between UE 102, node 104, AP 106 and/or with one or more other wireless communication devices, e.g., as described below. For example, UE 102 may include a wireless communication unit 110 and/or node 104 may include a wireless communication unit 130.

In some demonstrative embodiments, wireless communication units 110 and 130 may include, or may be associated with, one or more antennas. In one example, wireless communication unit 110 may be associated with at least two antennas, e.g., antennas 112 and 114, or any other number of antennas, e.g., one antenna or more than two antennas; and/or wireless communication unit 130 may be associated with at least two antennas, e.g., antennas 132 and 134, or any other number of antennas, e.g., one antenna or more than two antennas.

In some demonstrative embodiments, antennas 112, 114, 132 and/or 134 may include any type of antennas suitable for transmitting and/or receiving wireless communication signals, blocks, frames, transmission streams, packets, messages and/or data. For example, antennas 112, 114, 132 and/or 134 may include any suitable configuration, structure and/or arrangement of one or more antenna elements, components, units, assemblies and/or arrays. For example, antennas 112, 114, 132 and/or 134 may include a phased array antenna, a dipole antenna, a single element antenna, a set of switched beam antennas, and/or the like.

In some embodiments, antennas 112, 114, 132 and/or 134 may implement transmit and receive functionalities using separate transmit and receive antenna elements. In some embodiments, antennas 112, 114, 132 and/or 134 may implement transmit and receive functionalities using common and/or integrated transmit/receive elements.

In some demonstrative embodiments, wireless communication unit 130 may include at least one radio 142 and/or wireless communication unit 110 may include at least one radio 143. For example, radios 142 and/or 143 may include one or more wireless transmitters, receivers and/or transceivers able to send and/or receive wireless communication signals, RF signals, frames, blocks, transmission streams, packets, messages, data items, and/or data.

In some demonstrative embodiments, at least one radio 143 may include a WLAN transceiver (TRx) 163 to communicate with AP 106 over a WLAN link, and a cellular transceiver 165 to communicate with node 104 over a cellular link.

In some demonstrative embodiments, radio 142 may include a cellular transceiver 167 to communicate with UE 102 over the cellular link.

In some demonstrative embodiments, the WLAN link may include, for example, a Wireless Fidelity (WiFi) link, a Wireless Gigabit (WiGig) link, or any other link.

In some demonstrative embodiments, the WLAN link may include, for example, a link over the 2.4 Gigahertz (GHz) or 5 GHz frequency band, the 60 GHz frequency band, or any other frequency band.

In some demonstrative embodiments, wireless communication unit 110 may include at least one controller 145 to control communications performed by radio 143, RNC 183 may include one or more controllers 184 to control communications performed by Iub 185, and/or node 104 may include at least one controller 144 to control communications performed by radio 142 and/or Iub 146, e.g., as described below.

In some demonstrative embodiments, radios 142 and/or 143 may include a multiple input multiple output (MIMO) transmitters receivers system (not shown), which may be capable of performing antenna beamforming methods, if desired. In other embodiments, radios 142 and/or 143 may include any other transmitters and/or receivers.

In some demonstrative embodiments, cellular TRx 165 and/or cellular TRx 167 may include WCDMA and/or TD-SCDMA modulators and/or demodulators (not shown) configured to communicate downlink signals over downlink channels, e.g., between node 104 and UE 102, and uplink signals over uplink channels, e.g., between UE 102 and node 104. In other embodiments, radios 142 and/or 143 and/or cellular TRx 165 and/or cellular TRx 167 may include any other modulators and/or demodulators.

In some demonstrative embodiments, wireless communication unit 110 may establish a WLAN link with AP 106. For example, wireless communication unit 110 may perform the functionality of one or more STAs, e.g., one or more WiFi STAs, WLAN STAs, and/or DMG STAs. The WLAN link may include an uplink and/or a downlink. The WLAN downlink may include, for example, a unidirectional link from AP 106 to the one or more STAs or a unidirectional link from a Destination STA to a Source STA. The uplink may include, for example, a unidirectional link from a STA to AP 106 or a unidirectional link from the Source STA to the Destination STA.

In some demonstrative embodiments, UE 102, RNC 183, node 104 and/or AP 106 may also include, for example, one or more of a processor 124, an input unit 116, an output unit 118, a memory unit 120, and a storage unit 122. UE 102, RNC 183, node 104 and/or AP 106 may optionally include other suitable hardware components and/or software components.

In some demonstrative embodiments, some or all of the components of one or more of UE 102, RNC 183, node 104 and/or AP 106 may be enclosed in a common housing or packaging, and may be interconnected or operably associated using one or more wired or wireless links. In other embodiments, components of one or more of UE 102, RNC 183, node 104 and/or AP 106 may be distributed among multiple or separate devices.

Processor 124 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 124 executes instructions, for example, of an Operating System (OS) of UE 102, RNC 183, node 104 and/or AP 106 and/or of one or more suitable applications.

Input unit 116 includes, for example, a keyboard, a keypad, a mouse, a touch-screen, a touch-pad, a track-ball, a stylus, a microphone, or other suitable pointing device or input device. Output unit 118 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, may store data processed by UE 102, RNC 183, node 104 and/or AP 106.

In some demonstrative embodiments, UE 102 may be configured utilize a cellular connection, e.g., a UMTS cellular connection or any other cellular connection, to communicate with node 104, and a WLAN connection, e.g., a Wireless-Fidelity (WiFi) connection, a mmWave connection, a P2P connection, or any other WLAN connection, to communicate with AP 106.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In one example, system 100 may utilize a Multi-tier, Multi-Radio Access Technology (Multi-RAT) Het-Net architecture, including a tier of small cells, e.g., pico, femto, relay stations, WiFi APs, and the like, overlaid on top of a macro cellular deployment to augment network capacity.

In another example, system 100 may utilize Multi-RAT small cells integrating multiple radios such as WiFi and 3GPP air interfaces in a single infrastructure device.

In other embodiments, system 100 may implement any other architecture and/or deployment.

In some demonstrative embodiments, utilizing the WLAN connection as a default connection, e.g., as long as UE 102 receives from AP 106 a strong enough signal, may result in an increase in the congestion of the WLAN, e.g., if a large number of UEs simultaneously connect to the same AP, which in turn may result in a decrease of throughput over the WLAN connection between UE 102 and AP 106.

Additionally or alternatively, UE 102, node 104 and/or AP 106 may be configured to enable selective traffic routing, for example, based on one or more criteria and/or parameters, e.g., as described in detail below.

In some demonstrative embodiments, UE 102, node 104 and/or AP 106 may be configured to enable selective connection of UE 102 to the WLAN or the cellular network 103, for example, based on one or more criteria and/or parameters, e.g., as described in detail below.

In some demonstrative embodiments, the selective connection between UE 102 and node 104 or AP 106 may enable, for example, load balancing between the WLAN and the cellular network.

In some demonstrative embodiments, RNC 183, UE 102, node 104 and/or AP 106 may be configured to facilitate UE-centric (also referred to as "UE controlled") traffic routing.

The phrase "UE-centric traffic routing" as used herein may refer to UE-centric selection of at least one radio network to be used for communicating traffic ("UE-centric access network selection") and/or UE-centric steering of traffic via at least one radio network (UE-centric traffic steering"). For example, the traffic routing may include network access selection of an access network to be utilized by the UE; and/or selection of at least one access network to be used for routing at least one type of traffic.

In some demonstrative embodiments, RNC 183, UE 102, node 104 and/or AP 106 may be configured to facilitate a UE-centric traffic routing scheme including an access network selection scheme, in which UE 102 may select an access network to be utilized by UE 102. For example, UE 102 may select the access network based on network assistance information, which may be received from RNC 183, e.g., via node 104, and/or based on any other information and/or criteria from any other element of system 100, e.g., as described below. Additionally or alternatively, RNC 183, UE 102, node 104 and/or AP 106 may be configured to facilitate a UE-centric traffic steering (routing), in which UE 102 may route certain types of traffic to certain access networks based on network assistance information.

Some demonstrative embodiments may be implemented, for example, without requiring any changes for WLAN interfaces, e.g., by utilizing existing WLAN functionality.

In some demonstrative embodiments, RNC 183 may be configured to provide to UE 102, e.g., via node 104, UE assistance information to assist UE 102 in the access network selection and/or traffic steering, e.g., as described below.

In some demonstrative embodiments, the UE assistance information may be based on one or more parameters of cellular network 103, for example, a load of cellular network 103 and/or any other parameter, e.g., as described below.

In some demonstrative embodiments, RNC 183 may be configured to provide to UE 102, e.g., via node 104, the UE assistance information in the form of a value of at least one predefined parameter, which may be used by the UE 102 as part of access network selection and/or a traffic routing decision ("UE assistance parameter", also referred to as the "access network selection and/or traffic routing parameter"), e.g., as described in detail below.

In some demonstrative embodiments, UE 102 may control access network selection and/or traffic steering based on the value of the UE assistance parameter received from node 104, e.g., as described below.

In some demonstrative embodiments, the UE-assistance parameter may include a parameter related to a cellular network load of the cellular network 103 ("the cellular load-related parameter"), e.g., as described below.

In other embodiments, the UE assistance parameter may include any other parameter, which may be explicitly or implicitly related to the cellular network load and/or to any other attribute of the cellular network 103, e.g., as described below.

In some demonstrative embodiments, the UE assistance parameter may include a cellular threshold value of a cellular parameter of cellular network 103.

In some demonstrative embodiments, controller 145 may control access network selection and/or traffic routing of UE 102 with respect to a WLAN, e.g., WLAN 107, for example, based on the cellular threshold value and a value of the cellular parameter of cellular network 103, as described below.

In some demonstrative embodiments, the cellular threshold value may include a Received Signal Code Power (RSCP) threshold. For example, UE 102 may receive the RSCP threshold from node 104, and controller 145 may control traffic routing of UE 102 based on the RSCP threshold.

In one example, controller 145 may select to use cellular network 103, e.g., as long as an RSCP measurement of signals from node 104 is above the RSCP threshold. Controller 145 may select to use WLAN 107, e.g., if the RSCP measurement of signals from node 104 is not above the RSCP threshold. Additionally or alternatively, controller 145 may control routing of two or more different types of traffic, e.g., voice and File Transfer Protocol (FTP), according to two or more different RSCP thresholds.

In some demonstrative embodiments, the UE assistance parameter may include a value of a predefined parameter comparable to a WLAN parameter of at least one WLAN, e.g., WLAN 107, as described below.

In some demonstrative embodiments, the UE assistance parameter may include a threshold value of a predefined WLAN parameter of the at least one WLAN, e.g., WLAN 107, as described below.

In some demonstrative embodiments, the threshold value may include a WLAN load threshold value, e.g., as described below. In other embodiments, the threshold value may include a threshold value of any other WLAN parameter, e.g., as described below.

In some demonstrative embodiments, controller 145 may control access network selection and/or traffic steering of UE 102 with respect to a WLAN, e.g., WLAN 107, for example, based on the UE assistance parameter and a value of a predefined parameter of the WLAN, e.g., as described in detail below.

In some demonstrative embodiments, controller 145 may control access network selection and/or traffic steering of UE 102 with respect to a WLAN, e.g., WLAN 107, for example, based on the cellular load-related parameter, and a value of a predefined parameter, which may be based on a WLAN network load of the WLAN ("the WLAN load-related parameter"), e.g., as described in detail below.

In some demonstrative embodiments, UE 102 may determine the WLAN load-related parameter of WLAN 107, for example, based on WLAN information received from AP 106 and/or via one or more intermediate devices, for example, in the form of BSS Load and/or BSS available admission capacity information, e.g., accordance with the IEEE 802.11 specifications. In one example, UE 102 may determine the WLAN load of WLAN 107, e.g., based on load information received from AP 106.

In some demonstrative embodiments, controller 145 may control access network selection and/or traffic steering of UE 102 with respect to WLAN 107, for example, based on a predefined selection criterion applied to the value of the UE assistance parameter received from node 104 and a WLAN parameter of WLAN 107, e.g., as described below.

The phrase "network load" as used herein with respect to a communication network may relate to a load, an access network load, a backhaul load, a level of congestion, a capacity level, an available capacity, a free capacity, a usage level, a ratio between used capacity and available capacity, and/or an available bandwidth of the communication network.

For example, the phrase "WLAN network load" as used herein with respect to a WLAN may relate to a load, an access network load, a backhaul load, a level of congestion, a capacity level, an available capacity, a free capacity, a usage level, a ratio between used capacity and available capacity, and/or an available bandwidth of the WLAN.

For example, the phrase "cellular network load" as used herein with respect to a cell may relate to a load, an access network load, a backhaul load, a level of congestion, a capacity level, an available capacity, a free capacity, a usage level, a ratio between used capacity and available capacity, and/or an available bandwidth of the cell.

In some demonstrative embodiments, RNC 183 may control node 104 to transmit the UE-assistance information to a UE controlled by node 104, e.g., UE 102.

In some demonstrative embodiments, controller 184 may control Iub 185 to send to node 104 the UE-assistance information to be provided to a UE, e.g., UE, 102, connected to node 104.

In some demonstrative embodiments, Iub 146 may receive the UE assistance information from RNC 183, and controller 144 may control wireless communication unit 130 to transmit to UE 102 a message including one or more values of the UE assistance information, e.g., as described below.

In some demonstrative embodiments, Iub 146 may receive from RNC 183 UE-assistance information including a cellular signal strength threshold value, e.g., the RSCP threshold. For example, the message may include an Information Element (IE), e.g., a WLAN offload IE, including the cellular signal strength threshold value, e.g., the RSCP threshold, e.g., as described below.

In some demonstrative embodiments, Iub 146 may receive from RNC 183 UE-assistance information including a value of at least one UE assistance parameter, for example, a parameter which is based on a cellular network load of a cellular network controlled by RNC 183, e.g., as described above.

In some demonstrative embodiments, the value of the predefined parameter may by comparable to a WLAN parameter of at least one WLAN, e.g., WLAN 107.

In some demonstrative embodiments, controller 144 may control transceiver 167 to transmit to UE 102 a cellular communication message including the UE assistance information.

In some demonstrative embodiments, RNC 183 may control node 104 to provide to UE 102 an indication of the cellular network load of cellular network 103, e.g., to enable UE 102 to select from WLAN 107 and cellular network 103 a network having the lowest load. Additionally or alternatively, RNC 183 may control node 104 to provide to UE 102 an indication of the cellular network load of cellular network 103, e.g., to enable UE 102 to route certain traffic to WLAN 107 and/or cellular network 103.

In some demonstrative embodiments, the selection of the network having the lowest load may, for example, enable load balancing between cellular network 103 and WLAN 107.

In some demonstrative embodiments, RNC 183 may control node 104 to provide to UE 102 a value of a cellular load-related parameter, which may be based on the load of cellular network 103, and may be configured to enable UE 102 to select between cellular network 103 and WLAN 107 and/or to control traffic routing to WLAN 107, e.g., as described in detail below.

In some demonstrative embodiments, the UE assistance parameter may be configured to enable UE 102 to select between cellular network 103 and WLAN 107 or to route traffic to cellular network 103 and WLAN 107, for example, based on an amount of resources to be allocated to UE 102 by a cellular network controlled by RNC 183.

In some demonstrative embodiments, the cellular load-related parameter may include a resource allocation parameter representing an amount of resources for allocation to UE 102. For example, the cellular load-related parameter may include a resource allocation parameter representing a maximal amount of resources for allocation by RNC 183 to UE 102.

In some demonstrative embodiments, RNC 183 may control node 104 to provide to UE 102 the maximum resource allocation in terms of power-related information, e.g., as described below.

In some demonstrative embodiments, the resource allocation parameter may include a power parameter representing a power to be allocated, e.g., by RNC 183, to UE 102.

In some demonstrative embodiments, the power parameter may include a maximal power ratio to be allocated to UE 102. For example, the maximal power ratio may include a ratio between a power of a data traffic channel and a power of a pilot channel that UE 102 may be allowed to use.

In some demonstrative embodiments, cell 103 may have different uplink (UL) and downlink (DL) loads.

In some demonstrative embodiments, RNC 183 may provide to UE 102, e.g., via node 104, a UE assistance parameter including an uplink UE assistance parameter and/or a downlink UE assistance parameter.

In some demonstrative embodiments, RNC 183 may provide to UE 102, e.g., via node 104, a resource allocation parameter including an uplink resource allocation parameter and/or a downlink resource allocation parameter. In one example, the resource allocation parameter may include both the uplink resource allocation parameter and the downlink resource allocation parameter. In another example, the resource allocation parameter may include one of the uplink resource allocation parameter and the downlink resource allocation parameter.

In some demonstrative embodiments, the UE assistance parameter may explicitly include the resource allocation that UE 102 may receive when connected to cell 103. In other embodiments, the UE assistance parameter may include a parameter, which may implicitly indicate the resource allocation that UE 102 may receive when connected to cell 103.

In some demonstrative embodiments, RNC 183 may control node 104 to provide the UE-assistance parameter to UE 102, for example, when UE is at an Idle mode with respect to cell 103, e.g., as described below.

In some demonstrative embodiments, RNC 183 may control node 104 to provide the cellular load-related UE assistance parameter to UE 102, for example, when UE is at a connected mode with respect to cell 103, e.g., as described below. The connected mode may include, for example, a Dedicated Chanel (CELL_DCH) state, Forward access channel (CELL_FACH) state, a (Cell Paging channel (CELL_PCH) state, or a Universal Terrestrial Radio Access Network (UTRAN) Registration Area (URA) paging channel (URA_PCH) state, and the like.

In some demonstrative embodiments, UE 102 may receive from node 104 the UE assistance parameter corresponding to cellular network 103, and UE 102 may determine a maximal achievable rate of a cellular connection to cellular network 103.

For example, controller 145 may determine a maximal achievable rate of a connection between UE 102 and cellular network 103 based on the cellular load-related parameter and one or more additional parameters, e.g., bandwidth measurements, channel measurement, MIMO capabilities, and the like, e.g., as described below.

In some demonstrative embodiments, UE 102 may determine a maximal achievable rate of a WLAN connection between UE 102 and WLAN 107, for example, based on WLAN load information received from AP 106 and/or one or more additional parameters, e.g., bandwidth measurements, channel measurement, MIMO capabilities, and the like.

In some demonstrative embodiments, controller 145 may control access network selection and/or traffic routing of UE 102 based on a predefined selection criterion applied to the UE assistance parameter, e.g., as described below.

In some demonstrative embodiments, controller 145 may select between cellular network 103 and WLAN 107, for example, based on a comparison between the maximal achievable rate of the WLAN connection between UE 102 and WLAN 107 and the maximal achievable rate of the cellular connection between UE 102 and cellular network 103. Additionally or alternatively, controller 145 may route different types of traffic to cellular network 103 and WLAN 107, for example, based on a comparison between the maximal achievable rate of the WLAN connection between UE 102 and WLAN 107 and the maximal achievable rate of the cellular connection between UE 102 and cellular network 103.

For example, controller 145 may select from networks 103 and 107 the network providing the greater maximal achievable rate.

In some demonstrative embodiments, controller 145 may apply a hysteresis mechanism to the selection between networks 103 and 107, e.g., to prevent a "ping-pong" effect, for example, when UE 102 is located near a cell edge of cellular network 103. For example, the hysteresis mechanism my be applied to UEs, e.g., all UEs, within the coverage area of cell 103, for example, since a loading on cell 103 may change dynamically, e.g., in addition to received signal strength and/or interference conditions on cell 103, thereby affecting an overall data rate a UE may receive.

In some demonstrative embodiments, controller 145 may also use randomization as part of the network access selection mechanism, e.g., to avoid simultaneous switching with one or more other UEs to a given lightly loaded cell, which can result in an excessive number of access network switches. Controller 145 may derive randomization probabilities for the network access selection, for example, based on network assistance information directly received from node 104 and/or using randomization probabilities, which may be broadcast by node 104.

In some demonstrative embodiments, the selection between cellular network 103 and WLAN 107 and/or traffic routing to cellular network 103 and/or WLAN 107 may take into consideration one or more additional parameters, e.g., according to a more complex access network selection mechanism.

In one example, an access network selection decision, e.g., to select between cellular network 103 and WLAN 107, may be based on user preferences, operator policies, e.g., provided via an Access Network Discovery and Selection Function (ANDSF) mechanism, and the like.

In some demonstrative embodiments, utilizing the maximal achievable rate of the WLAN connection between UE 102 and WLAN 107 and the maximal achievable rate of the cellular connection between UE 102 and cellular network 103 may enable UE 102, for example, to make an optimal access network selection decision and/or traffic routing decision, e.g., to connect to the network providing best performance in terms of maximal achievable rate, signal quality and/or load.

In some demonstrative embodiments, UE 102 may be connected to both cellular network 103 and WLAN 107, e.g., simultaneously. According to these embodiments, controller 145 may control UE 102 to route one or more types of traffic via cellular network 103 and one or more other types of traffic via WLAN 107, e.g., based on the maximal achievable rate of the WLAN connection between UE 102 and WLAN 107 and the maximal achievable rate of the cellular connection between UE 102 and cellular network 103.

In some demonstrative embodiments, utilizing the maximal achievable rate of the WLAN connection between UE 102 and WLAN 107 and the maximal achievable rate of the connection between UE 102 and cellular network 103 may enable, for example, load balancing between cellular network 103 and WLAN 107, for example, since the maximal achievable rates of networks 103 and 107 may be based on the load of networks 103 and 107.

In some demonstrative embodiments, node 104 may transmit a cellular communication message including the UE assistance parameter of cellular network 103, e.g., as described below.

In some demonstrative embodiments, transceiver 167 may transmit the cellular communication message configured to be received by UE 102 at the Idle state.

In some demonstrative embodiments, transceiver 167 may transmit the cellular communication message as part of a System Information block (SIB) message.

In some demonstrative embodiments, the SIB message may include a dedicated SIB defined for communicating the UE assistance parameter.

In other embodiments, the UE assistance parameter may be included as part of any other SIB, for example, SIB type 3, 4, or any other SIB.

In some demonstrative embodiments, it may be advantageous for RNC 183 and/or node 104 to not provide to UE 102 explicit information about an actual exact load of cellular network 103. For example, some cellular network operators may consider the information about the actual network load of the cellular network to be sensitive information.

In some demonstrative embodiments, RNC 183 and/or node 104 may be configured to provide the UE assistance parameter to UE 102, while not directly, explicitly, and/or easily exposing potentially sensitive information relating to the actual exact network load and/or one or more other attributes of cellular network 103, e.g., as described below.

In some demonstrative embodiments, RNC 183 and/or node 104 may be configured to provide the UE assistance parameter to UE 102 in the form of a threshold value, e.g., as described below.

In some demonstrative embodiments, RNC 183 may be configured to provide the UE assistance parameter in the form of a cellular signal strength threshold parameter, which may be comparable to a measured cellular signal strength of the cellular network UE 102 is connected to, e.g., as described below.

In some demonstrative embodiments, the cellular signal strength threshold parameter may include a RSCP threshold, e.g., as described below. In other embodiments, the cellular threshold value may include a Reference Signal Received Power (RSRP) threshold, or any other threshold related to cellular signal strength.

In some demonstrative embodiments, the signal threshold value may include an RSCP threshold value.

In some demonstrative embodiments, UE 102 may perform access network selection by comparing the cellular signal strength threshold parameter to a measured signal strength of a cell it is connected to, e.g. UE 102 may prefer WLAN access network if a measured RSCP is below the signal RSCP threshold. Additionally or alternatively, UE 102 may route different types of traffic to different access networks by comparing the cellular signal strength threshold parameter to a measured signal strength of a cell it is connected to, e.g., one signal strength threshold may be configured for FTP traffic and a different signal strength threshold may be configured for voice traffic.

In some demonstrative embodiments, controller 184 may determine the RSCP threshold value based on an actual load of cellular network 103. The RSCP threshold may optionally depend on one or more additional parameters and/or conditions of cellular network 103.

In some demonstrative embodiments, RNC 183 may set the RSCP threshold value, for example, based on the load of cellular network 103. For example, RNC 183 may set the RSCP threshold value to cause UE 102 to select to use cellular network 103, e.g., as long an RSCP measurement of signals from node 104 is above the first RSCP threshold value.

Controller 184 may controllably set the RSCP threshold value, for example, based on the load of cellular network. For example, controller 184 may increase the RSCP threshold value, e.g., to cause UE 102 to prefer selecting cellular network 103, and/or controller 184 may decrease the RSCP threshold value, e.g., to cause UE 102 to prefer selecting WLAN 107.

In some demonstrative embodiments, node 104 may transmit a cellular communication message including the RSCP threshold of cellular network 103, e.g., as described below.

In some demonstrative embodiments, transceiver 167 may transmit the cellular communication message configured to be received by UE 102 at the Idle state.

In some demonstrative embodiments, transceiver 167 may transmit the cellular communication message as part of SIB message.

In some demonstrative embodiments, the SIB message may include a dedicated SIB defined for communicating the UE assistance parameter.

In other embodiments, the UE assistance parameter may be included as part of any other SIB, for example, SIB type 3, 4, or any other SIB.

In one example, node 104 may transmit the RSCP threshold value as part of a SIB type 3. For example, node 104 may transmit the RSCP threshold value as part of an offload IE, e.g., a "WLAN offload RSCP threshold" IE, of the SIB Type 3, e.g., as follows:

| Information Element/Group name | Need | Multi | Type and reference | Semantics description | Version |
| --- | --- | --- | --- | --- | --- |
| SIB4 Indicator | MP | | Boolean | TRUE indicates that SIB4 is broadcast in the cell. When the UE receives SIB3 in the System Information Container message, this IE is interpreted as FALSE. | |
| UTRAN mobility information elements | | | | | |
| Cell identity | MP | | Cell identity 10.3.2.2 | | |
| Cell selection and re-selection info | MP | | Cell selection and re-selection info for SIB3/4 10.3.2.3 | | |
| Cell Access Restriction | MP | | Cell Access Restriction 10.3.2.1 | | |
| Domain Specific Access Restriction Parameters For PLMN Of MIB | OP | | Domain Specific Access Restriction Parameters 10.3.1.3c | This IE specifies the Domain Specific Access Restriction Parameters for UEs which has chosen the PLMN in the IE "PLMN identity" of the Master Information Block. If the cell is operating in MBSFN mode as indicated in subclause 8.1.1.6.3 the UE behaviour upon reception of this IE is unspecified. | REL-6 |
| Domain Specific Access Restriction For Shared Network | OP | | | If the cell is operating in MBSFN mode as indicated in subclause 8.1.1.6.3 the UE behaviour upon reception of this IE is unspecified. | REL-6 |

| Information Element/Group name | Need | Multi | Type and reference | Semantics description | Version |
|---|---|---|---|---|---|
| >CHOICE barring representation | MP | | | | REL-6 |
| >>Domain Specific Access Restriction List | | | | | REL-6 |
| >>>Domain Specific Access Restriction Parameters For Operator1 | OP | | Domain Specific Access Restriction Parameters 10.3.1.3c | This IE specifies the Domain Specific Access Restriction Parameters for UEs which has chosen the first PLMN in the IE "multiplePLMNs" in the IE "Multiple PLMN List" of the Master Information Block. | REL-6 |
| >>>Domain Specific Access Restriction Parameters For Operator2 | OP | | Domain Specific Access Restriction Parameters 10.3.1.3c | This IE specifies the Domain Specific Access Restriction Parameters for UEs which has chosen the second PLMN in the IE "multiplePLMNs" in the IE "Multiple PLMN List" of the Master Information Block. | REL-6 |
| >>>Domain Specific Access Restriction Parameters For Operator3 | OP | | Domain Specific Access Restriction Parameters 10.3.1.3c | This IE specifies the Domain Specific Access Restriction Parameters for UEs which has chosen the third PLMN in the IE "multiplePLMNs" in the IE "Multiple PLMN List" of the Master Information Block. | REL-6 |
| >>>Domain Specific Access Restriction Parameters For Operator4 | OP | | Domain Specific Access Restriction Parameters 10.3.1.3c | This IE specifies the Domain Specific Access Restriction Parameters for UEs which has chosen the fourth PLMN in the IE "multiplePLMNs" in the IE "Multiple PLMN List" of the Master Information Block. | REL-6 |
| >>>Domain Specific Access Restriction Parameters For Operator5 | OP | | Domain Specific Access Restriction Parameters 10.3.1.3c | This IE specifies the Domain Specific Access Restriction Parameters for UEs which has chosen the fifth PLMN in the IE "multiplePLMNs" in the IE "Multiple PLMN List" of the Master Information Block. | REL-6 |
| >>Domain Specific Access Restriction Parameters For All | | | | | REL-6 |
| >>>Domain Specific Access Restriction Parameters | | | Domain Specific Access Restriction Parameters 10.3.1.3c | This IE specifies the common Domain Specific Access Restriction Parameters applied to all PLMNs in the IE "multiplePLMNs" in the IE "Multiple | REL-6 |

| Information Element/Group name | Need | Multi | Type and reference | Semantics description | Version |
|---|---|---|---|---|---|
| | | | | PLMN List" of the Master Information Block. | |
| Deferred measurement control reading support | OP | | | If present, the UE may apply deferred reading of SIB11, SIB11bis, SIB12, SIB18 and SIB19. If not present, deferred reading may not be applied. | REL-7 |
| >CHOICE mode | OP | | | If absent, the default reporting quantities are: "CPICH RSCP" (FDD) and "Primary CCPCH RSCP" (TDD). | REL-7 |
| >>FDD | | | | | REL-7 |
| >>>Intra-frequency reporting quantity SIB3 | MP | | Enumerated(CPICH Ec/N0, CPICH RSCP) | | REL-7 |
| >>TDD | | | | | REL-7 |
| >>>Reporting quantity list | MP | 1 to 2 | | | REL-7 |
| >>>>Intra-frequency reporting quantity SIB3 | MP | | Enumerated (Primary CCPCH RSCP, Timeslot ISCP) | | REL-7 |
| MBSFN only service | OP | | Enumerated (TRUE) | Indicates if the cell provides only MBMS services in MBSFN mode | REL-7 |
| Paging Permission with Access Control Parameters For PLMN Of MIB | OP | | Paging Permission with Access Control Parameters 10.3.1.10a | This IE specifies the Paging Permission With Access Control Parameters for UEs which has chosen the PLMN in the IE "PLMN identity" of the Master Information Block. If the cell is operating in MBSFN mode as indicated in subclause 8.1.1.6.3 the UE behaviour upon reception of this IE is unspecified. | REL-8 |
| Paging Permission with Access Control For Shared Network | OP | | | If the cell is operating in MBSFN mode as indicated in subclause 8.1.1.6.3 the UE behaviour upon reception of this IE is unspecified. | REL-8 |
| >CHOICE barring representation | MP | | | | REL-8 |
| >>Paging Permission with Access Control List | | | | | REL-8 |
| >>>Paging Permission with Access Control Parameters For Operator1 | OP | | Paging Permission with Access Control Parameters 10.3.1.10a | This IE specifies the Paging Permission with Access Control Parameters for UEs which has chosen the first PLMN in the IE "multiplePLMNs" in the IE "Multiple PLMN List" of the Master Information Block. | REL-8 |

| Information Element/Group name | Need | Multi | Type and reference | Semantics description | Version |
|---|---|---|---|---|---|
| >>>Paging Permission with Access Control Parameters For Operator2 | OP | | Paging Permission with Access Control Parameters 10.3.1.10a | This IE specifies the Paging Permission with Access Control Parameters for UEs which has chosen the second PLMN in the IE "multiplePLMNs" in the IE "Multiple PLMN List" of the Master Information Block. | REL-8 |
| >>>Paging Permission with Access Control Parameters For Operator3 | OP | | Paging Permission with Access Control Parameters 10.3.1.10a | This IE specifies the Paging Permission with Access Control Parameters for UEs which has chosen the third PLMN in the IE "multiplePLMNs" in the IE "Multiple PLMN List" of the Master Information Block. | REL-8 |
| >>>Paging Permission with Access Control Parameters For Operator4 | OP | | Paging Permission with Access Control Parameters 10.3.1.10a | This IE specifies the Paging Permission with Access Control Parameters for UEs which has chosen the fourth PLMN in the IE "multiplePLMNs" in the IE "Multiple PLMN List" of the Master Information Block. | REL-8 |
| >>>Paging Permission with Access Control Parameters For Operator5 | OP | | Paging Permission with Access Control Parameters 10.3.1.10a | This IE specifies the Paging Permission with Access Control Parameters for UEs which has chosen the fifth PLMN in the IE "multiplePLMNs" in the IE "Multiple PLMN List" of the Master Information Block. | REL-8 |
| >>Paging Permission with Access Control Parameters For All | | | | | REL-8 |
| >>>Paging Permission with Access Control Parameters | MP | | Paging Permission with Access Control Parameters 10.3.1.10a | This IE specifies the common Paging Permission with Access Control Parameters applied to all PLMNs in the IE "multiplePLMNs" in the IE "Multiple PLMN List" of the Master Information Block. | REL-8 |
| CSG Identity | OP | | CSG Identity 10.3.2.8 | | REL-8 |
| CSG PSC Split Information | OP | | CSG PSC Split Information 10.3.2.9 | This IE specifies the Primary Scrambling Code reservation information for CSG Cells. | REL-8 |
| IMS Emergency Support Indicator | OP | | Enumerated (supported) | This IE specifies the support of IMS emergency call in the cell for limited service mode UE | REL-9 |
| WLAN offload preference | OP | | | If present indicates offload to WLAN preference | |

-continued

| Information Element/Group name | Need | Multi | Type and reference | Semantics description | Version |
|---|---|---|---|---|---|
| WLAN offload RSCP threshold | | | | If present indicates RSCP threshold value used for WLAN offload | |

In some demonstrative embodiments, transceiver 167 may transmit the SIB configured to be received by UE 102 at the Idle state or connected state, e.g., the CELL_FACH state, the CELL_PCH state, or the URA_PCH state.

In some demonstrative embodiments, transceiver 167 may transmit the RSCP threshold value as part of a RRC signaling message, e.g., a RRC signaling message directed to UE 102, for example, to be received by UE 102 at the connected state, e.g., the CELL_FACH state, the CELL_PCH state, or the URA_PCH state.

In some demonstrative embodiments, transceiver 167 may transmit the RSCP threshold value as part of a Radio Bearer Setup message, Radio Bearer Reconfiguration message, Cell Update Confirm message, a URA Update Confirm message, or any other existing or dedicated RRC message.

In one example, transceiver 167 may transmit the RSCP threshold value as part of an offload Information Element (IE), e.g., a "WLAN offload RSCP threshold" IE, of the Radio Bearer Reconfiguration message, e.g., as follows:

| Information Element/Group name | Need | Multi | Type and reference | Semantics description | Version |
|---|---|---|---|---|---|
| Message Type | MP | | Message Type | | |
| UE Information elements | | | | | |
| RRC transaction identifier | MP | | RRC transaction identifier 10.3.3.36 | | |
| Integrity check info | CH | | Integrity check info 10.3.3.16 | | |
| Integrity protection mode info | OP | | Integrity protection mode info 10.3.3.19 | The UTRAN should not include this IE unless it is performing an SRNS relocation or a handover from GERAN Iu mode | |
| Ciphering mode info | OP | | Ciphering mode info 10.3.3.5 | The UTRAN should not include this IE unless it is performing either an SRNS relocation or a handover from GERAN Iu mode and a change in ciphering algorithm | |
| Activation time | MD | | Activation time 10.3.3.1 | Default value is "now" | |
| Delay restriction flag | OP | | Enumerated (TRUE) | This IE is always set to TRUE and included if the activation time is restricted according to subclause 8.6.3.1 | REL-6 |
| New U-RNTI | OP | | U-RNTI 10.3.3.47 | | |
| New C-RNTI | OP | | C-RNTI 10.3.3.8 | | |
| New DSCH-RNTI | OP | | DSCH-RNTI 10.3.3.9a | Should not be set in FDD. If received The UE behaviour is unspecified. | |
| New H-RNTI | OP | | H-RNTI 10.3.3.14a | | REL-5 |
| New Primary E-RNTI | OP | | E-RNTI 10.3.3.10a | | REL-6 |
| New Secondary E-RNTI | OP | | E-RNTI 10.3.3.10a | FDD only | REL-6 |

-continued

| Information Element/Group name | Need | Multi | Type and reference | Semantics description | Version |
|---|---|---|---|---|---|
| RRC State Indicator | MP | | RRC State Indicator 10.3.3.35a | | |
| UE Mobility State Indicator | CV-FAC H_P CH | | Enumerated (High-mobility Detected) | Absence of this IE implies that, according to [4], the UE shall consider itself being in the mobility state the UE has maintained in CELL_DCH state or being not in high mobility state after the state transition, if applicable. | REL-7 |
| UTRAN DRX cycle length coefficient | OP | | UTRAN DRX cycle length coefficient 10.3.3.49 | | |
| CN information elements | | | | | |
| CN Information info | OP | | CN Information info 10.3.1.3 | | |
| UTRAN mobility information elements | | | | | |
| RNC support for change of UE capability | OP | | Boolean | Should be included if the message is used to perform an SRNS relocation | REL-7 |
| Reconfiguration in response to requested change of UE capability | OP | | Enumerated (TRUE) | | REL-7 |
| URA identity | OP | | URA identity 10.3.2.6 | | |
| Specification mode information elements | | | | | REL-8 |
| Default configuration for CELL_FACH | CV-SRNS_RELOCATION | | Default configuration for CELL_FACH 10.3.4.0a | | REL-8 |
| CHOICE specification mode | MP | | | | REL-5 |
| >Complete specification RB information elements | | | | | |
| >>RAB information to reconfigure list | OP | 1 to < maxRABsetup > | | | |
| >>>RAB information to reconfigure | MP | | RAB information to reconfigure 10.3.4.11 | | |
| >>RAB information for MBMS ptp bearer list | OP | 1 to > maxMBMSservSelect > | | | REL-6 |
| >>>RAB information for MBMS ptp bearer | MP | | RAB information for MBMS ptp bearer 10.3.4.9a | | REL-6 |

-continued

| Information Element/Group name | Need | Multi | Type and reference | Semantics description | Version |
|---|---|---|---|---|---|
| >>RB information to reconfigure list | MP | 1 to <max RB> | | Although this IE is not always required, need is MP to align with ASN.1 | |
| | OP | | | | REL-4 |
| >>>RB information to reconfigure | MP | | RB information to reconfigure 10.3.4.18 | | |
| >>RB information to be affected list | OP | 1 to <max RB> | | | |
| >>>RB information to be affected | MP | | RB information to be affected 10.3.4.17 | | |
| >>RB with PDCP context relocation info list | OP | 1 to <max RBall RABs> | | This IE is needed for each RB having PDCP and performing PDCP context relocation | REL-5 |
| >>>PDCP context relocation info | MP | | PDCP context relocation info 10.3.4.1a | | REL-5 |
| >>PDCP ROHC target mode | OP | | PDCP ROHC target mode 10.3.4.2a | | REL-5 |
| >>UM RLC re-establishment RB List | OP | 1 to <max RB> | | | REL-10 |
| >>>RB bearer to be re-established | MP | | RB identity, 10.3.4.16 | UE behaviour is unspecified if RB identity in this IE indicates a value, which is less than or equal to 4 or indicates a radio bearer, which does not use UM RLC or is not associated with PS domain. | REL-10 |
| TrCH Information Elements Uplink transport channels | | | | | |
| >>UL Transport channel information common for all transport channels | OP | | UL Transport channel information common for all transport channels 10.3.5.24 | | |
| >>Deleted TrCH information list | OP | 1 to <max TrCH> | | | |
| >>>Deleted UL TrCH information | MP | | Deleted UL TrCH information 10.3.5.5 | | |
| >>Added or Reconfigured TrCH information list | OP | 1 to <max TrCH> | | | |
| >>>Added or Reconfigured UL TrCH information | MP | | Added or Reconfigured UL TrCH information 10.3.5.2 | | |

-continued

| Information Element/Group name | Need | Multi | Type and reference | Semantics description | Version |
|---|---|---|---|---|---|
| Downlink transport channels | | | | | |
| >>DL Transport channel information common for all transport channels | OP | | DL Transport channel information common for all transport channels 10.3.5.6 | | |
| >>Deleted TrCH information list | OP | 1 to <max TrCH> | | | |
| >>>Deleted DL TrCH information | MP | | Deleted DL TrCH information 10.3.5.4 | | |
| >>Added or Reconfigured TrCH information list | OP | 1 to <max TrCH> | | | |
| >>>Added or Reconfigured DL TrCH information | MP | | Added or Reconfigured DL TrCH information 10.3.5.1 | | |
| >Preconfiguration | | | | | REL-5 |
| >>CHOICE Preconfiguration mode | MP | | | This value only applies in case the message is sent through GERAN Iu mode | |
| >>>Predefined configuration identity | MP | | Predefined configuration identity 10.3.4.5 | | |
| >>>Default configuration | | | | | |
| >>>>Default configuration mode | MP | | Enumerated (FDD, TDD) | Indicates whether the FDD or TDD version of the default configuration shall be used | |
| >>>>Default configuration identity | MP | | Default configuration identity 10.3.4.0 | | |
| PhyCH information elements | | | | | |
| Frequency info | OP | | Frequency info 10.3.6.36 | | |
| Multi-frequency Info | OP | | Multi-frequency Info 10.3.6.39a | This IE is used for 1.28 Mcps TDD only | REL-7 |
| DTX-DRX timing information | OP | | DTX-DRX timing information 10.3.6.34b | | REL-7 |
| DTX-DRX Information | OP | | DTX-DRX Information 10.3.6.34a | | REL-7 |
| HS-SCCH less Information | OP | | HS-SCCH less Information 10.3.6.36ab | | REL-7 |
| MIMO parameters | OP | | MIMO parameters 10.3.6.41a | | REL-7 |

-continued

| Information Element/Group name | Need | Multi | Type and reference | Semantics description | Version |
|---|---|---|---|---|---|
| MIMO mode with four transmit antennas parameters | OP | | MIMO mode with four transmit antennas parameters 10.3.6.142 | | REL-11 |
| Control Channel DRX information | OP | | Control Channel DRX information 1.28 Mcps TDD 10.3.6.107 | This IE is used for 1.28 Mcps TDD only | REL-8 |
| SPS Information | OP | | SPS information 1.28 Mcps TDD 10.3.6.110 | This IE is used for 1.28 Mcps TDD only | REL-8 |
| MU-MIMO info | OP | | MU-MIMO info 1.28 Mcps TDD 10.3.6.122 | This IE is used for 1.28 Mcps TDD only | REL-10 |
| Uplink radio resources | | | | | |
| Maximum allowed UL TX power | MD | | Maximum allowed UL TX power 10.3.6.39 | Default value is the existing maximum UL TX power | |
| Uplink DPCH info | OP | | Uplink DPCH info 10.3.6.88 | | |
| E-DCH Info | OP | | E-DCH Info 10.3.6.97 | | REL-6 |
| Uplink secondary cell info FDD | OP | | Uplink secondary cell info FDD 10.3.6.115 | FDD only | REL-9 |
| Multi-carrier E-DCH Info for LCR TDD | OP | | Multi-carrier E-DCH Info for LCR TDD 10.3.6.97a | 1.28 Mcps TDD only | REL-10 |
| Uplink CLTD info FDD | OP | | Uplink CLTD info FDD 10.3.6.125 | FDD only | REL-11 |
| Uplink OLTD info FDD | OP | | Uplink OLTD info FDD 10.3.6.126 | FDD only | REL-11 |
| Downlink radio resources | | | | | |
| Downlink HS-PDSCH Information | OP | | Downlink HS-PDSCH Information 10.3.6.23a | | REL-5 |
| Downlink information common for all radio links | OP | | Downlink information common for all radio links 10.3.6.24 | | |
| Downlink information per radio link list | MP | 1 to <max RL> | | Although this IE is not always required, need is MP to align with ASN.1 | |
| | OP | | | | REL-4 |
| >Downlink information for each radio link | MP | | Downlink information for each radio link 10.3.6.27 | | |

-continued

| Information Element/Group name | Need | Multi | Type and reference | Semantics description | Version |
|---|---|---|---|---|---|
| Downlink secondary cell info FDD | OP | | Downlink secondary cell info FDD 10.3.6.31a | FDD only | REL-8 |
| Additional downlink secondary cell info list FDD | OP | 2 | | | REL-10 |
| >Downlink secondary cell info FDD | OP | | Downlink secondary cell info FDD 10.3.6.31a | FDD only | REL-10 |
| Additional downlink secondary cell info list FDD 2 | OP | 4 | | | REL-11 |
| >Downlink secondary cell info FDD | OP | | Downlink secondary cell info FDD 10.3.6.31a | FDD only | REL-11 |
| Common E-RGCH info FDD | OP | | Common E-RGCH info FDD 10.3.6.138 | FDD only | REL-11 |
| MBMS PL Service Restriction Information | OP | | Enumerated (TRUE) | | REL-6 |
| CELL_DCH measurement occasion info LCR | OP | | CELL_DCH measurement occasion info LCR 10.3.7.126 | | REL-9 |
| WLAN offload preference | OP | | | If present indicates offload to WLAN preference | |
| WLAN offload RSCP threshold | | | | If present indicates RSCP threshold value used for WLAN offload | |

In some demonstrative embodiments, RNC 183 and/or node 104 may be configured to provide the UE assistance parameter to UE 102 in the form of a threshold value of a WLAN parameter of WLAN 107, e.g., as described below.

In some demonstrative embodiments, controller 145 may be configured to perform the network selection and/or traffic routing based on a relationship between the threshold value of the WLAN parameter and a value of the WLAN parameter, which may be determined with respect to WLAN 107, e.g., as described below.

In some demonstrative embodiments, the threshold value may include a load threshold value of a WLAN load of the WLAN, e.g., as described below.

In some demonstrative embodiments, the threshold value may include a Quality-of-Service (QoS) threshold value of a QoS class of the WLAN.

In some demonstrative embodiments, the threshold value may include a network signal strength threshold of a WLAN signal strength.

In some demonstrative embodiments, the threshold value may include WLAN maximum achievable throughput threshold value.

In other embodiments, the threshold value may include a threshold value of any other parameter corresponding to WLAN 107.

In some demonstrative embodiments, providing the threshold value to UE 102 may enable RNC 183 to steer traffic of UE 102 from the UMTS network to WLAN 107, for example, when the UMTS network is overloaded, and/or to steer traffic of UE 102 to the UMTS, for example, when the load in the UMTS network is relatively low.

In some demonstrative embodiments, RNC 183 may control node 104 to provide the UE assistance parameter in the form of a load threshold parameter, which may be comparable to a network load parameter of WLAN 107, e.g., as described below.

In some demonstrative embodiments, controller 145 may be configured to control access network selection and/or traffic steering of UE 102 with respect to WLAN 107 based on a predefined selection criterion applied to the load threshold parameter and a WLAN load of WLAN 107, e.g., as described below.

In some demonstrative embodiments, UE 102 may determine the WLAN load of WLAN 107, for example, based on information received from AP 106, for example, based on a BSS load information element (IE) broadcast by AP 106, or via any other mechanism, e.g., the ANDSF mechanism.

In some demonstrative embodiments, providing the load threshold parameter to UE 102 may enable UE 102 to make an access network selection and/or traffic steering decision without, for example, exposing to UE 102 a precise actual network load and/or one or more other attributes of cellular node 103.

In some demonstrative embodiments, controller 184 may determine the load threshold parameter based on an actual load of cellular network 103. The load threshold parameter may optionally depend on one or more additional parameters and/or conditions of cellular network 103.

In some demonstrative embodiments, providing the load threshold parameter to UE 102 may enable UE 102 to perform access network selection and/or traffic routing, which may take into account the cellular network load of cellular network 103, for example, without disclosing to UE 102 the actual exact cellular load of cellular network 103.

In some demonstrative embodiments, controller 184 of RNC 183 may determine the threshold value to be provided to UE 102, e.g., via node 104.

In some demonstrative embodiments, controller 184 may determine the threshold value, for example, based on a status of the UMTS network, e.g., without the need to interface with WLAN 107. For example, controller 184 may adjust the threshold value based on a load of the UMTS and/or based on operator preferences to steer more users to/from WLAN 107.

In some demonstrative embodiments, additionally or alternatively, controller 184 may collect information on WLAN network & load conditions, and determine the threshold value based on the WLAN network and/or load conditions.

In some demonstrative embodiments, controller 184 may configure the threshold value based one or more additional criteria and/or conditions, e.g., to influence the access network selection and/or traffic routing by controller 145.

In one example, controller 184 may decide to maintain UE 102 connected to cellular network 103, for example, even when a comparison between the WLAN load of WLAN 107 and the cellular load of cellular network 103 may theoretically justify offloading UE 102 to WLAN 107, e.g., even when the WLAN load of WLAN 107 is very low and/or lesser than the cellular load of cellular network 103.

In another example, controller 184 may decide to cause UE 102 to offload to WLAN 107, for example, even when a comparison between the WLAN load of WLAN 107 and the cellular load of cellular network 103 may theoretically justify using the cellular connection with cellular network 103, e.g., even when the WLAN load of WLAN 107 is very high and/or higher than the cellular load of cellular network 103.

In some demonstrative embodiments, the selection criterion used by controller 145 may be a function of a measured received signal strength indication (RSSI) measured by UE 102 with respect to WLAN 107, an RSSI threshold, the WLAN load of WLAN 107 and the WLAN threshold value received from node 104.

In some demonstrative embodiments, the selection criterion may be based on a ratio between a first difference between the measured RSSI and the RSSI threshold, and a second difference between the WLAN load of WLAN 107 and the WLAN load threshold value received from node 104.

In one example, controller 145 may make an access network decision ("mobility decision") to offload communication of UE 102 to WLAN 107, for example, if the following criterion is met:

$$(RSSI-RSS\_t)*f+(LOAD\_t-LOAD)>0 \qquad (1)$$

wherein RSSI denotes a WLAN RSSI of WLAN 107, e.g., as measured by UE 102; wherein RSSI_t denotes a RSSI threshold, which may be used by UE 102 to make mobility decisions; wherein f denotes a predefined factor; wherein LOAD denotes a load of WLAN 107, e.g., as determined by or received by UE 102; and wherein LOAD_t denotes the WLAN load threshold value, e.g., as received by UE 102 from node 104.

For example, controller 145 may prefer communicating over the WLAN connection with AP 106, e.g., when Criterion 1 is met, and controller 145 may prefer communicating over the cellular connection with node 104, e.g., when Criterion 1 is not met.

In some demonstrative embodiments, the selection criterion used by controller 145 may be a function of a WLAN bandwidth of WLAN 107, the WLAN load of WLAN 107 and the WLAN threshold value received from node 104.

In some demonstrative embodiments, controller 145 may select WLAN 107, for example, when a product of the WLAN bandwidth of WLAN 107 and the WLAN load of WLAN 107 is greater than the WLAN threshold value received from node 104.

For example, controller 145 may make the mobility decision to offload communication of UE 102 to WLAN 107, for example, if the following criterion is met:

$$W\_b*W\_l>T \qquad (2)$$

wherein W_b denotes a WLAN bandwidth of WLAN 107; wherein W_l denotes a WLAN load of WLAN 107, e.g., as determined by or received by UE 102; and wherein T denotes the WLAN threshold value, e.g., as received by UE 102 from node 104. For example, T may be determined by RNC 183 based on a bandwidth, e.g., a UMTS bandwidth, of cell 103, denoted L_b, and a load, e.g., an LTE load, of cell 103, denoted L_l. For example, node 104 may determine the threshold T as T=L_b*L_l.

For example, controller 145 may prefer communicating over the WLAN connection with AP 106, e.g., when Criterion 2 is met, and controller 145 may prefer communicating over the cellular connection with node 104, e.g., when Criterion 2 is not met.

According to this example, controller 145 may be able to make the mobility decision, which is based on the cellular load of cellular network 103, e.g., as represented by the WLAN threshold parameter T, which is received from node 104, without, for example, the actual exact cellular load of cellular network 103 being disclosed to UE 102.

In some demonstrative embodiments, node 104 may transmit a cellular communication message including the WLAN threshold value, for example, the WLAN load threshold value and/or the RSCP threshold value, e.g., as described below.

In some demonstrative embodiments, transceiver 167 may transmit, e.g., broadcast, the cellular communication message including the WLAN threshold value and/or the RSCP threshold value configured to be received by UE 102 at the Idle state.

In some demonstrative embodiments, transceiver 167 may transmit, e.g., broadcast, the cellular communication message including the parameter threshold value as part of a System Information block (SIB) message.

In some demonstrative embodiments, the SIB message may include a dedicated SIB defined for communicating the parameter threshold value.

In one example, the parameter threshold value may be included as part of a dedicated SIB type 16 ("SIB 16"), or any other type. The SIB 16 may be defined, for example, to include information relevant for inter-Radio-Access-Technologies (inter-RAT) mobility and network selection/reselection and/or traffic routing.

For example, the SIB 16 may include a value of a parameter, denoted wlanOffladRSCPThreshold in dBm, representing the RSCP threshold value, which may be used by UE 102 to make mobility decisions to/from WLAN, e.g., as follows:

```
-- ASN1START
SystemInformationBlockType16 ::=    SEQUENCE {
    wlanOffloadRSCPThreshold            INTEGER (0..115)
-- ASN1STOP
```

In other embodiments, the load threshold parameter, e.g., the value of the parameter wlanOffladRSCPThreshold, may be included as part of any other SIB, for example, SIB type 3, 4, 5, 6 7, 8, or any other SIB.

In some demonstrative embodiments, transceiver 167 may transmit the cellular communication message including the parameter threshold value to be received by UE 102 at the connected state.

In some demonstrative embodiments, transceiver 167 may transmit the cellular communication message including the parameter threshold value as part of a Radio-Resource Control (RRC) signaling message, e.g., a RRC signaling message directed to UE 102.

In some demonstrative embodiments, transceiver 167 may transmit the cellular communication message including the parameter threshold value as part of a Radio Bearer Setup message, a Radio Bearer Reconfiguration message, a Cell Update Confirm message, a URA Update Confirm message, or any other RRC message, e.g., as described above.

In some demonstrative embodiments, RNC 183 may provide to UE 102, e.g., via node 104, the UE assistance parameter in the form of a WLAN cell reselection priority value, e.g., as described below.

In some demonstrative embodiments, RNC 183 and/or node 104 may utilize a priority based cell reselection mechanism configured to support WLAN, e.g., in addition to cellular networks.

In some demonstrative embodiments, RNC 183 may control node 104 to transmit to UE a cellular communication message including a reselection frequency list. The reselection frequency list may include a plurality of WLAN frequencies, including a WLAN frequency of WLAN 107, associated with a plurality of cell reselection priorities, including a reselection priority of WLAN 107, e.g., as described below.

In some demonstrative embodiments, a System Information Block (SIB), for example, SIB type 19 or a new SIB, may be configured to include frequency and/or priority information to support the priority based cell reselection mechanism for the WLAN. For example, node 104 may broadcast the SIB including the reselection frequency list.

In some demonstrative embodiments, a RRC message may be configured to include inter-RAT frequency and priority information for cell reselection, including WLAN network, frequency and priority information.

In some demonstrative embodiments, node 104 may provide to UE 102 the reselection frequency list, e.g., as part of system information, which may be included in the RRC message.

In some demonstrative embodiments, UE 102 may select a frequency with highest priority that satisfies a cell selection criteria, e.g., when UE 102 is at idle mode.

In one example, UE 102 may consider selecting to switch from a current RAT cell, e.g., cell 103, to WLAN 107, for example, if the WLAN priority defined for WLAN 107 is greater than a priority of the current RAT, for example, according to the cell reselection criteria, e.g., when UE 102 determines a quality of the current cell is not good enough for UE 102.

In some demonstrative embodiments, RNC 183 may configure the reselection frequency list based on the load of cellular network 103, e.g., to enable RNC 183 to control the access network selection decision performed by UE 102 based on the reselection frequency list.

In one example, RNC 183 may control node 104 to transmit the reselection list as part of an SIB, e.g., an SIB type 19, including Inter-RAT frequency and priority information to be used in the cell. For example, as part of a "WLAN frequency and priority list" IE of the SIB type 19, e.g., as follows:

| Information Element/Group name | Need | Multi | Type and reference | Semantics description | Version |
|---|---|---|---|---|---|
| UTRA priority info list | MP | | UTRA priority info list 10.3.7.113 | | REL-8 |
| GSM priority info list | OP | | GSM priority info list 10.3.7.114 | | REL-8 |
| GSM ScalingFactor for Treselection | OP | | Real (0.25..4 by step of 0.25) | If present, it is used by the UE as scaling factor for Treselection$_s$ or Treselection$_{s,PCH}$ or Treselection$_{s,FACH}$ for inter-RAT absolute priority based cell reselection evaluation to GSM [4]. It replaces Inter-RAT ScalingFactor for Treselection in SIB3/4, if available. | REL-11 |
| E-UTRA frequency and priority info list | OP | | E-UTRA frequency and priority info list 10.3.7.115 | | REL-8 |
| E-UTRA ScalingFactor for Treselection | OP | | Real (0.25..4 by step of 0.25) | If present, it is used by the UE as scaling factor for Treselection$_s$ or | REL-11 |

-continued

| Information Element/Group name | Need | Multi | Type and reference | Semantics description | Version |
|---|---|---|---|---|---|
| | | | | $Treselection_{s,PCH}$ or $Treselection_{s,FACH}$ for inter-RAT absolute priority based cell reselection evaluation to E-UTRA [4]. It replaces Inter-RAT ScalingFactor for Treselection in SIB3/4, if available. | |
| E-UTRA frequency RACH reporting information | OP | | E-UTRA frequency RACH reporting information 10.3.7.139 | | REL-11 |
| CELL_FACH Absolute Priority Measurement Indicator | OP | | Enumerated (High Priority Layers, All Layers) | High Priority Layers means that absolute priority measurements are only required in CELL_FACH state on higher priority layers when Srxlev and Squal of the serving cell are above Sprioritysearch1 and Sprioritysearch2. All Layers means that absolute priority measurements are always required in CELL_FACH state according to the rules in [4] and requirements in [19]. A UE that indicates FGI3 but not FGI4 shall behave as if High priority Layers is indicated. | REL-11 |
| WLAN frequency and priority list | OP | | WLAN priority info list | | |

In some demonstrative embodiments, RNC 183 may provide to UE 102, e.g., via node 104, the UE assistance parameter in the form of a WLAN access class barring probability value.

In some demonstrative embodiments, RNC 183 may adjust access class barring probabilities according to relative loads of one or more WLAN APs, e.g., AP 106. For example, if the relative load of neighboring WLAN APs is lesser than the load of cellular network 103, then RNC 183 may increase the access class barring probabilities to ensure that fewer UEs will select node 104 and more UEs will select WLAN AP 106.

In some demonstrative embodiments, RNC 183 may control node 104 to transmit to UE a cellular communication message including an access barring indication to bar UE 102 from using the cellular link with node 104, for example, in order to cause UE 102 to use a WLAN link, or to bar UE 102 from using the WLAN link with WLAN 107, for example, in order to cause UE 102 to use a cellular link.

In one example, controller 145 may be configured to control UE 102, e.g., when UE is at Idle mode, to use WLAN access, e.g., to WLAN 107, instead of cellular access, e.g., to cell 103, for example, when UE 102 is access class barred.

In some demonstrative embodiments, controller 184 of RNC 183 may decide to use access class barring to move UEs to WLAN 107, for example, based on UMTS network load and optionally based on WLAN network information.

In some demonstrative embodiments, RNC 183 and/or node 104 may provide to UE 102 a WLAN threshold value, e.g., as described above. In other embodiments, RNC 183 and/or node 104 may provide to UE 102 any other value relating to a WLAN parameter of WLAN 107. In one example, the UE assistance information may include one or more "probabilities for network selection", which may be utilized by UE 102 for access network selection. In another example, RNC 183 may control node 104 to broadcast a price/cost/effective load of a network that can steer UE 102 towards optimal network selection.

Figure 2:
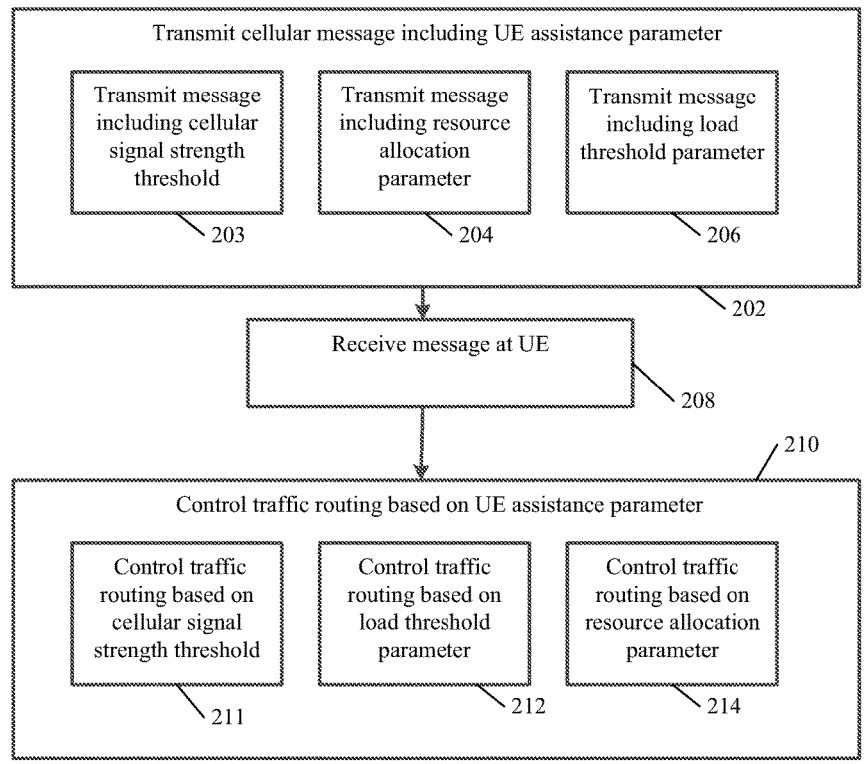
FIG. 2 is a schematic flow-chart illustration of a method of User Equipment (UE) centric traffic routing, in accordance with some demonstrative embodiments.

Reference is made to FIG. 2, which schematically illustrates a method of UE-centric traffic routing, in accordance with some demonstrative embodiments. In some embodiments, one or more of the operations of the method of FIG. 2 may be performed by a wireless communication system e.g., system 100 (FIG. 1); a device, e.g., UE 102 (FIG. 1), RNC 183 (FIG. 1), node 104 (FIG. 1) and/or AP 106 (FIG. 1); a controller, e.g., controller 184 (FIG. 1), controller 144 (FIG. 1) and/or controller 145 (FIG. 1); and/or a wireless communication unit, e.g., wireless communication units 110 and/or 130 (FIG. 1).

As indicated at block 202, the method may include transmitting a cellular communication message from a cellular node to a UE over a cellular communication medium, the message including a UE assistance parameter. The UE assistance parameter may include, for example, a value of a predefined parameter, which is based on a cellular network load of a cellular network controlled by the cellular node. For example, node 104 (FIG. 1) may transmit to UE 102 (FIG. 1) a cellular communication message, for example, a SIB message or an RRC signaling message, including the UE assistance parameter, e.g., as described above.

As indicated at block 203, transmitting a cellular communication message may include transmitting a cellular communication message including a cellular signal strength threshold value comparable to a signal strength of the cellular network. For example, node 104 (FIG. 1) may transmit to UE 102 (FIG. 1) a cellular communication message, for example, a SIB message or an RRC signaling message, including the RSCP threshold, e.g., as described above.

As indicated at block 204, transmitting a cellular communication message may include transmitting a cellular communication message including a resource allocation parameter representing an amount of resource for allocation to the UE. For example, RNC 183 (FIG. 1) may control node 104 (FIG. 1) to transmit to UE 102 (FIG. 1) a cellular communication message, for example, a SIB message or an RRC signaling message, including a resource allocation parameter indicating an allocation of resources to UE 102 (FIG. 1), e.g., as described above.

As indicated at block 206, transmitting a cellular communication message may include transmitting a cellular communication message including a load threshold value comparable to a non-cellular network load of a non-cellular network. For example, node 104 (FIG. 1) may transmit to UE 102 (FIG. 1) a cellular communication message, for example, a SIB message or an RRC signaling message, including a WLAN load threshold value, e.g., as described above.

As indicated at block 208, the method may include receiving the cellular communication message at the UE. For example, UE 102 (FIG. 1) may receive the cellular communication message, e.g., as described above.

As indicated at block 210, the method may include controlling access network selection and/or traffic steering of the UE with respect to a WLAN based on the UE assistance parameter. For example, controller 145 (FIG. 1) may control access network selection of UE 102 (FIG. 1) and/or traffic steering with respect to WLAN 107 (FIG. 1) based on the UE assistance parameter, e.g., as described above As indicated at block 211, controlling access network selection and/or traffic steering of the UE may include controlling access network selection and/or traffic steering of the UE based on a comparison between a measured signal strength of the cellular network and the cellular signal strength threshold value. For example, controller 145 (FIG. 1) may control access network selection and/or traffic steering of UE 102 (FIG. 1) based on a comparison between a measured RSCP of cell 103 and the RSCP threshold, e.g., as described above.

As indicated at block 212, controlling access network selection and/or traffic steering of the UE may include controlling access network selection and/or traffic steering of the UE based on a predefined selection criterion applied to the WLAN load threshold value and a WLAN load of the WLAN. For example, controller 145 (FIG. 1) may control access network selection of UE 102 (FIG. 1) based on Criterion 1 or Criterion 2, e.g., as described above.

As indicated at block 214, controlling access network selection and/or traffic steering of the UE may include determining an achievable rate of communication with the cellular node based on the value of the resource allocation parameter, and controlling access network selection of the UE based on a comparison between the achievable rate of communication with the cellular node and an achievable rate of communication with the WLAN.

For example, controller 145 (FIG. 1) may determine an achievable rate of communication with node (FIG. 1) based on the value of the resource allocation parameter received from node 104 (FIG. 1), and may control access network selection and/or traffic steering of UE 102 (FIG. 1) based on a comparison between the achievable rate of communication with node 104 (FIG. 1) and an achievable rate of communication with WLAN 107 (FIG. 1), e.g., as described above.

Figure 3:
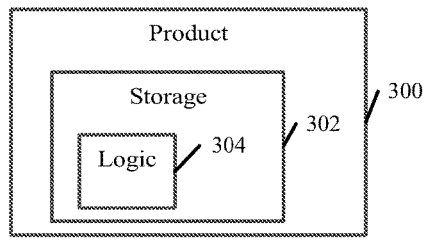
FIG. 3 is a schematic illustration of a product, in accordance with some demonstrative embodiments.

Reference is made to FIG. 3, which schematically illustrates a product of manufacture 300, in accordance with some demonstrative embodiments. Product 300 may include a non-transitory machine-readable storage medium 302 to store logic 304, which may be used, for example, to perform at least part of the functionality of RNC 183 (FIG. 1), UE 102 (FIG. 1), node 104 (FIG. 1), AP 106 (FIG. 1), controller 184 (FIG. 1), controller 144 (FIG. 1), controller 145 (FIG. 1), wireless communication unit 110 (FIG. 1), wireless communication unit 130 (FIG. 1) and/or to perform one or more operations of the method of FIG. 2. The phrase "non-transitory machine-readable medium" is directed to include all computer-readable media, with the sole exception being a transitory propagating signal.

In some demonstrative embodiments, product 300 and/or machine-readable storage medium 302 may include one or more types of computer-readable storage media capable of storing data, including volatile memory, non-volatile memory, removable or non-removable memory, erasable or non-erasable memory, writeable or re-writeable memory, and the like. For example, machine-readable storage medium 302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a node B of a Universal Mobile Telecommunications System (UMTS), the Node B comprising a transceiver to communicate with a User Equipment (UE) over a cellular link; an Interface Unit b (Iub) to communicate with a Radio Network Controller (RNC), the Iub to receive a UE assistance information from the RNC, the UE-assistance information including a Wireless Local Area Network offload parameter, which is based on a cellular network load of a cellular network controlled by the RNC; and a controller to control the transceiver to transmit to the UE a cellular communication message including the WLAN offload parameter.

Example 2 includes the subject matter of Example 1, and optionally, wherein the WLAN offload parameter comprises a resource allocation parameter representing an amount of resources to be allocated by the RNC to the UE.

Example 3 includes the subject matter of Example 2, and optionally, wherein the resource allocation parameter comprises a power parameter representing a power to be allocated by the RNC to the UE.

Example 4 includes the subject matter of Example 3, and optionally, wherein the power parameter comprises a maximal power ratio to be allocated to the UE, the maximal power ratio comprises a ratio between a power of a data traffic channel and a power of a pilot channel.

Example 5 includes the subject matter of Example 1, and optionally, wherein the WLAN offload parameter comprises a cellular signal strength threshold corresponding to a signal strength of the cellular network.

Example 6 includes the subject matter of Example 5, and optionally, wherein the cellular signal strength threshold comprises a received signal code power (RSCP) threshold.

Example 7 includes the subject matter of Example 1, and optionally, wherein the WLAN offload parameter comprises a threshold value of a WLAN parameter.

Example 8 includes the subject matter of Example 7, and optionally, wherein the threshold value comprises a load threshold value of a WLAN load.

Example 9 includes the subject matter of Example 7, and optionally, wherein the threshold value comprises a Quality-of-Service (QoS) threshold value of a QoS class of a WLAN.

Example 10 includes the subject matter of Example 7, and optionally, wherein the threshold value comprises a network signal strength threshold of a WLAN signal strength.

Example 11 includes the subject matter of Example 1, and optionally, wherein the WLAN offload parameter comprises a WLAN cell reselection priority.

Example 12 includes the subject matter of Example 1, and optionally, wherein the UE WLAN offload comprises a WLAN access class barring probability.

Example 13 includes the subject matter of any one of Examples 1-12, and optionally, wherein the cellular communication message comprises a Radio-Resource Control (RRC) signaling message.

Example 14 includes the subject matter of any one of Examples 1-12, and optionally, wherein the cellular communication message comprises a System Information block (SIB).

Example 15 includes the subject matter of any one of any one of Examples 1-12, and optionally, wherein the transmitter is to transmit the cellular communication message to be received by the UE is at an Idle state.

Example 16 includes the subject matter of any one of any one of Examples 1-12, and optionally, wherein the transmitter is to transmit the cellular communication message to be received by the UE is at a connected state.

Example 17 includes the subject matter of any one of Examples 1-16, and optionally, wherein the Iub is to receive the UE assistance information according to a Node-B Application Part (NBAP) signaling protocol.

Example 18 includes a User Equipment (UE) comprising a Wireless Local Area Network (WLAN) transceiver; a cellular transceiver to receive a cellular communication message from a node B of a Universal Mobile Telecommunications System (UMTS), the cellular communication message including a Wireless Local Area Network (WLAN) offload Information Element (IE) including a cellular signal threshold value; and a controller to control traffic routing of the UE to a WLAN based on a comparison between a measured signal strength of the node B and the cellular signal threshold value.

Example 19 includes the subject matter of Example 18, and optionally, wherein the WLAN offload IE includes a plurality of cellular signal threshold values corresponding to a plurality of traffic types, and wherein the controller is to control routing of traffic of the plurality of traffic types according to the plurality of cellular signal threshold values.

Example 20 includes the subject matter of Example 18 or 19, and optionally, wherein the cellular signal threshold value comprises a received signal code power (RSCP) threshold.

Example 21 includes the subject matter of Example 20, and optionally, wherein the controller is to route traffic to the node B if the measured signal strength of the node B is greater than the cellular signal threshold value.

Example 22 includes the subject matter of Example 20 or 21, and optionally, wherein the controller is to route traffic to the WLAN if the measured signal strength of the node B is equal to or lesser than the cellular signal threshold value.

Example 23 includes the subject matter of any one of Examples 18-22, and optionally, wherein the cellular communication message comprises a Radio-Resource Control (RRC) signaling message.

Example 24 includes the subject matter of any one of Examples 18-22, and optionally, wherein the cellular communication message comprises a System Information block (SIB).

Example 25 includes the subject matter of any one of any one of Examples 18-22, and optionally, wherein the cellular transceiver is to receive the cellular communication message when the UE is at an Idle state.

Example 26 includes the subject matter of any one of any one of Examples 18-22, and optionally, wherein the cellular transceiver is to receive the cellular communication message when the UE is at a connected state.

Example 27 includes a User Equipment (UE) comprising a Wireless Local Area Network (WLAN) transceiver; a cellular transceiver to receive a cellular communication message from a node B of a Universal Mobile Telecommunications System (UMTS), the cellular communication message including a threshold value of a WLAN parameter; and a controller to control access network selection of the UE based on a predefined selection criterion applied to the threshold value and a value of the WLAN parameter corresponding to a WLAN.

Example 28 includes the subject matter of Example 27, and optionally, wherein the threshold value comprises a WLAN load threshold value, and wherein the controller is to control the access network selection based on the WLAN load threshold value and a load of the WLAN.

Example 29 includes the subject matter of Example 28, and optionally, wherein the selection criterion is a function of a measured received signal strength indication (RSSI) measured by the UE with respect to the WLAN, an RSSI threshold, the load of the WLAN and the WLAN load threshold value.

Example 30 includes the subject matter of Example 29, and optionally, wherein the selection criterion is based on a ratio between a first difference between the measured RSSI and the RSSI threshold, and a second difference between the load of the WLAN and the WLAN load threshold value.

Example 31 includes the subject matter of Example 28, and optionally, wherein the selection criterion is a function of a WLAN bandwidth of the WLAN, the load of the WLAN and the WLAN load threshold value.

Example 32 includes the subject matter of Example 31, and optionally, wherein the controller is to select the WLAN when a product of the WLAN bandwidth of the WLAN and the load of the WLAN is greater than the WLAN load threshold value.

Example 33 includes the subject matter of any one of Examples 27-32, and optionally, wherein the cellular communication message comprises a Radio-Resource Control (RRC) signaling message.

Example 34 includes the subject matter of any one of Examples 27-32, and optionally, wherein the cellular communication message comprises a System Information block (SIB).

Example 35 includes the subject matter of any one of any one of Examples 27-32, and optionally, wherein the cellular transceiver is to receive the cellular communication message when the UE is at an Idle state.

Example 36 includes the subject matter of any one of any one of Examples 27-32, and optionally, wherein the cellular transceiver is to receive the cellular communication message when the UE is at a connected state.

Example 37 includes a User Equipment (UE) comprising a Wireless Local Area Network (WLAN) transceiver; a cellular transceiver to receive a cellular communication message from a node B of a Universal Mobile Telecommunications System (UMTS), the cellular communication message including a value of a predefined parameter comparable to a Wireless Local Area Network (WLAN) parameter of at least one WLAN; and a controller to control access network selection of the UE with respect to the WLAN based on the value of the parameter.

Example 38 includes the subject matter of Example 37, and optionally, wherein the predefined parameter comprises a resource allocation parameter representing an amount of resources to be allocated by the cellular network to the UE.

Example 39 includes the subject matter of Example 38, and optionally, wherein the resource allocation parameter comprises a power parameter representing a power to be allocated by the cellular network to the UE.

Example 40 includes the subject matter of Example 39, and optionally, wherein the power parameter comprises a maximal power ratio to be allocated to the UE, the maximal power ratio comprises a ratio between a power of a data traffic channel and a power of a pilot channel.

Example 41 includes the subject matter of any one of Examples 38-40, and optionally, wherein the controller is to determine an achievable rate of communication with the cellular network based on the value of the resource allocation parameter, and to control the access network selection based on a comparison between the achievable rate of communication with the cellular network and an achievable rate of communication with the WLAN.

Example 42 includes the subject matter of Example 37, and optionally, wherein the value of the predefined parameter comprises a threshold value of the WLAN parameter.

Example 43 includes the subject matter of Example 42, and optionally, wherein the threshold value comprises a load threshold value of a WLAN load of the WLAN.

Example 44 includes the subject matter of Example 43, and optionally, wherein the controller to control the access network selection based on a predefined selection criterion applied to the load threshold value and the WLAN load of the WLAN.

Example 45 includes the subject matter of Example 44, and optionally, wherein the criterion is a function of a measured received signal strength indication (RSSI) measured by the UE with respect to the WLAN, an RSSI threshold, the WLAN load of the WLAN and the WLAN threshold.

Example 46 includes the subject matter of Example 44, and optionally, wherein the selection criterion is a function of a WLAN bandwidth of the WLAN, the WLAN load of the WLAN and the WLAN threshold.

Example 47 includes the subject matter of Example 42, and optionally, wherein the threshold value comprises a Quality-of-Service (QoS) threshold value of a QoS class of the WLAN.

Example 48 includes the subject matter of Example 42, and optionally, wherein the threshold value comprises a network signal strength threshold of a WLAN signal strength.

Example 49 includes the subject matter of Example 37, and optionally, wherein the value of the predefined parameter comprises a WLAN cell reselection priority.

Example 50 includes the subject matter of Example 37, and optionally, wherein the value of the predefined parameter comprises a WLAN access class barring probability.

Example 51 includes the subject matter of any one of Examples 37-50, and optionally, wherein the cellular communication message comprises a Radio-Resource Control (RRC) signaling message.

Example 52 includes the subject matter of any one of Examples 37-50, and optionally, wherein the cellular communication message comprises a System Information block (SIB).

Example 53 includes the subject matter of any one of any one of Examples 37-50, and optionally, wherein the cellular transceiver is to receive the cellular communication message when the UE is at an Idle state.

Example 54 includes the subject matter of any one of any one of Examples 37-50, and optionally, wherein the cellular transceiver is to receive the cellular communication message when the UE is at a connected state.

Example 55 includes a method comprising communicating between node B of a Universal Mobile Telecommunications System (UMTS) and a User Equipment (UE) at least one cellular communication message over a cellular communication medium, the message including a Wireless Local Area Network (WLAN) offloading information element (IE) including value of a predefined parameter, which is based on a cellular network load of a cellular network.

Example 56 includes the subject matter of Example 55, and optionally, wherein the predefined parameter comprises a resource allocation parameter representing an amount of resources to be allocated by the cellular network to the UE.

Example 57 includes the subject matter of Example 56, and optionally, wherein the resource allocation parameter comprises a power parameter representing a power to be allocated by the cellular network to the UE.

Example 58 includes the subject matter of Example 57, and optionally, wherein the power parameter comprises a maximal power ratio to be allocated to the UE, the maximal power ratio comprises a ratio between a power of a data traffic channel and a power of a pilot channel.

Example 59 includes the subject matter of Example 55, and optionally, wherein the value of the predefined parameter comprises a threshold value of a WLAN parameter.

Example 60 includes the subject matter of Example 59, and optionally, wherein the threshold value comprises a load threshold value of a WLAN load.

Example 61 includes the subject matter of Example 59, and optionally, wherein the threshold value comprises a Quality-of-Service (QoS) threshold value of a QoS class of a WLAN.

Example 62 includes the subject matter of Example 59, and optionally, wherein the threshold value comprises a network signal strength threshold of a WLAN signal strength.

Example 63 includes the subject matter of Example 55, and optionally, wherein the value of the predefined parameter comprises a WLAN cell reselection priority.

Example 64 includes the subject matter of Example 55, and optionally, wherein the value of the predefined parameter comprises a WLAN access class barring probability.

Example 65 includes the subject matter of any one of Examples 55-64, and optionally, wherein the cellular communication message comprises a Radio-Resource Control (RRC) signaling message.

Example 66 includes the subject matter of any one of Examples 55-64, and optionally, wherein the cellular communication message comprises a System Information block (SIB).

Example 67 includes the subject matter of any one of any one of Examples 55-64, and optionally, comprising communicating the cellular communication message when the UE is at an Idle state.

Example 68 includes the subject matter of any one of any one of Examples 55-64, and optionally, comprising communicating the cellular communication message when the UE is at a connected state.

Example 69 includes the subject matter of any one of any one of Examples 55-68, and optionally, comprising transmitting the cellular communication message from the node B to the UE.

Example 70 includes the subject matter of Example 69, and optionally, comprising receiving the value of the parameter from a Radio Network Controller (RNC) according to a Node-B Application Part (NBAP) signaling protocol.

Example 71 includes the subject matter of any one of any one of Examples 55-68, and optionally, comprising receiving the cellular communication message at the UE.

Example 72 includes the subject matter of Example 71, and optionally, comprising controlling traffic routing or access network selection of the UE with respect to a WLAN based on the value of the parameter.

Example 73 includes the subject matter of Example 72, and optionally, wherein the predefined parameter comprises a maximal resource allocation parameter representing a maximal number of resource blocks for allocation by the cellular network to the UE, the controlling comprises determining an achievable rate of communication with the cellular node based on the value of the resource allocation parameter, and controlling the access network selection based on a comparison between the achievable rate of communication with the cellular node and an achievable rate of communication with the WLAN.

Example 74 includes the subject matter of Example 72, and optionally, wherein the value of the predefined parameter comprises a WLAN load threshold value, and wherein the controlling comprises controlling the access network selection based on a predefined selection criterion applied to the WLAN load threshold value and a WLAN load of the WLAN.

Example 75 includes a method comprising receiving at a UE a cellular communication message from a node B of a Universal Mobile Telecommunications System (UMTS), the cellular communication message including a resource allocation parameter representing an amount of resources to be allocated to the UE by a cellular network; determining an achievable rate of communication with the cellular network based on the resource allocation parameter; and controlling access network selection of the UE with respect to a Wireless Local Area Network (WLAN) based on a comparison between the achievable rate of communication with the cellular network and an achievable rate of communication with the WLAN.

Example 76 includes the subject matter of Example 75, and optionally, wherein the resource allocation parameter comprises a power parameter representing a power to be allocated by the cellular network to the UE.

Example 77 includes the subject matter of Example 76, and optionally, wherein the power parameter comprises a maximal power ratio to be allocated to the UE, the maximal power ratio comprises a ratio between a power of a data traffic channel and a power of a pilot channel.

Example 78 includes the subject matter of any one of Examples 75-77, and optionally, wherein the resource allocation parameter comprises an uplink resource allocation parameter and a downlink resource allocation parameter.

Example 79 includes the subject matter of any one of Examples 75-78, and optionally, wherein the cellular communication message comprises a Radio-Resource Control (RRC) signaling message.

Example 80 includes the subject matter of any one of Examples 75-78, and optionally, wherein the cellular communication message comprises a System Information block (SIB).

Example 81 includes the subject matter of any one of any one of Examples 75-78, and optionally, comprising receiving the cellular communication message when the UE is at an Idle state.

Example 82 includes the subject matter of any one of any one of Examples 75-78, and optionally, comprising receiving the cellular communication message when the UE is at a connected state.

Example 83 includes a method comprising receiving at a User Equipment (UE) a cellular communication message from a node B of a Universal Mobile Telecommunications System (UMTS), the cellular communication message including a Wireless Local Area Network (WLAN) threshold value corresponding to a WLAN parameter; and determining a value of the WLAN parameter corresponding to a WLAN; controlling access network selection or traffic routing of the UE with respect to the WLAN based on the WLAN threshold value and the determined value of the WLAN parameter.

Example 84 includes the subject matter of Example 83, and optionally, wherein the WLAN threshold value comprises a load threshold value.

Example 85 includes the subject matter of Example 84, and optionally, comprising controlling access network selection or traffic routing of the UE based on the load threshold value and a load of the WLAN.

Example 86 includes the subject matter of Example 85, and optionally, comprising controlling access network selection or traffic routing of the UE based on a measured received signal strength indication (RSSI) measured by the UE with respect to the WLAN, an RSSI threshold, the load of the WLAN and the load threshold value.

Example 87 includes the subject matter of Example 86, and optionally, comprising controlling access network selection or traffic routing of the UE based on a ratio between a first difference between the measured RSSI and the RSSI threshold, and a second difference between the load of the WLAN and the load threshold value.

Example 88 includes the subject matter of Example 85, and optionally, comprising controlling access network selection or traffic routing of the UE based on a WLAN bandwidth of the WLAN, the load of the WLAN and the load threshold value.

Example 89 includes the subject matter of Example 88, and optionally, comprising selecting the WLAN when a product of the WLAN bandwidth of the WLAN and the load of the WLAN is greater than the load threshold value.

Example 90 includes the subject matter of Example 83, and optionally, wherein the WLAN threshold value comprises a Quality-of-Service (QoS) threshold value of a QoS class of the WLAN.

Example 91 includes the subject matter of Example 83, and optionally, wherein the WLAN threshold value comprises a network signal strength threshold of a WLAN signal strength.

Example 92 includes the subject matter of any one of Examples 83-91, and optionally, wherein the cellular communication message comprises a Radio-Resource Control (RRC) signaling message.

Example 93 includes the subject matter of any one of Examples 83-91, and optionally, wherein the cellular communication message comprises a System Information block (SIB).

Example 94 includes the subject matter of any one of any one of Examples 83-91, and optionally, comprising receiving the cellular communication message when the UE is at an Idle state.

Example 95 includes the subject matter of any one of any one of Examples 83-91, and optionally, comprising receiving the cellular communication message when the UE is at a connected state.

Example 96 includes a product including a non-transitory storage medium having stored thereon instructions that, when executed by a machine, result in communicating between a node B of a Universal Mobile Telecommunications System (UMTS) and a User Equipment (UE) at least one cellular communication message over a cellular communication medium, the message including a value of a predefined parameter, which is based on a cellular network load of a cellular network, the value of the predefined parameter is comparable to a Wireless Local Area Network (WLAN) parameter of at least one WLAN.

Example 97 includes the subject matter of Example 96, and optionally, wherein the predefined parameter comprises a resource allocation parameter representing an amount of resources to be allocated by the cellular network to the UE.

Example 98 includes the subject matter of Example 97, and optionally, wherein the resource allocation parameter comprises a power parameter representing a power to be allocated by the cellular network to the UE.

Example 99 includes the subject matter of Example 98, and optionally, wherein the power parameter comprises a maximal power ratio to be allocated to the UE, the maximal power ratio comprises a ratio between a power of a data traffic channel and a power of a pilot channel.

Example 100 includes the subject matter of Example 96, and optionally, wherein the value of the predefined parameter comprises a threshold value of the WLAN parameter.

Example 101 includes the subject matter of Example 100, and optionally, wherein the threshold value comprises a load threshold value of a WLAN load of the WLAN.

Example 102 includes the subject matter of Example 100, and optionally, wherein the threshold value comprises a Quality-of-Service (QoS) threshold value of a QoS class of the WLAN.

Example 103 includes the subject matter of Example 100, and optionally, wherein the threshold value comprises a network signal strength threshold of a WLAN signal strength.

Example 104 includes the subject matter of Example 96, and optionally, wherein the value of the predefined parameter comprises a WLAN cell reselection priority.

Example 105 includes the subject matter of Example 96, and optionally, wherein the value of the predefined parameter comprises a WLAN access class barring probability.

Example 106 includes the subject matter of any one of Examples 96-105, and optionally, wherein the cellular communication message comprises a Radio-Resource Control (RRC) signaling message.

Example 107 includes the subject matter of any one of Examples 96-105, and optionally, wherein the cellular communication message comprises a System Information block (SIB).

Example 108 includes the subject matter of any one of any one of Examples 96-105, and optionally, wherein the instructions result in communicating the cellular communication message when the UE is at an Idle state.

Example 109 includes the subject matter of any one of any one of Examples 96-105, and optionally, wherein the instructions result in communicating the cellular communication message when the UE is at a connected state.

Example 110 includes the subject matter of any one of any one of Examples 96-109, and optionally, wherein the instructions result in transmitting the cellular communication message from the node B to the UE.

Example 111 includes the subject matter of Example 110, and optionally, wherein the instructions result in receiving the value of the parameter from a Radio Network Controller (RNC) according to a Node-B Application Part (NBAP) signaling protocol.

Example 112 includes the subject matter of any one of any one of Examples 96-109, and optionally, wherein the instructions result in receiving the cellular communication message at the UE.

Example 113 includes the subject matter of Example 112, and optionally, wherein the instructions result in controlling access network selection of the UE with respect to the WLAN based on the value of the parameter.

Example 114 includes the subject matter of Example 113, and optionally, wherein the predefined parameter comprises a maximal resource allocation parameter representing a maximal number of resource blocks for allocation by the cellular network to the UE, wherein the instructions result in determining an achievable rate of communication with the cellular node based on the value of the resource allocation parameter, and controlling the access network selection based on a comparison between the achievable rate of communication with the cellular node and an achievable rate of communication with the WLAN.

Example 115 includes the subject matter of Example 113, and optionally, wherein the value of the predefined parameter comprises a WLAN load threshold value, and wherein the instructions result in controlling the access network selection based on a predefined selection criterion applied to the WLAN load threshold value and a WLAN load of the WLAN.

Example 116 includes a product including a non-transitory storage medium having stored thereon instructions that, when executed by a machine, result in receiving at a UE a cellular communication message from a node B of a Universal Mobile Telecommunications System (UMTS), the cellular communication message including a resource allocation parameter representing an amount of resources to be allocated to the UE by a cellular network; determining an achievable rate of communication with the cellular network based on the resource allocation parameter; and controlling access network selection of the UE with respect to a Wireless Local Area Network (WLAN) based on a comparison between the achievable rate of communication with the cellular network and an achievable rate of communication with the WLAN.

Example 117 includes the subject matter of Example 116, and optionally, wherein the resource allocation parameter comprises a power parameter representing a power to be allocated by the cellular network to the UE.

Example 118 includes the subject matter of Example 117, and optionally, wherein the power parameter comprises a maximal power ratio to be allocated to the UE, the maximal power ratio comprises a ratio between a power of a data traffic channel and a power of a pilot channel.

Example 119 includes the subject matter of any one of Examples 116-118, and optionally, wherein the resource allocation parameter comprises an uplink resource allocation parameter and a downlink resource allocation parameter.

Example 120 includes the subject matter of any one of Examples 116-119, and optionally, wherein the cellular communication message comprises a Radio-Resource Control (RRC) signaling message.

Example 121 includes the subject matter of any one of Examples 116-119, and optionally, wherein the cellular communication message comprises a System Information block (SIB).

Example 122 includes the subject matter of any one of any one of Examples 116-119, and optionally, wherein the instructions result in receiving the cellular communication message when the UE is at an Idle state.

Example 123 includes the subject matter of any one of any one of Examples 116-119, and optionally, wherein the instructions result in receiving the cellular communication message when the UE is at a connected state.

Example 124 includes a product including a non-transitory storage medium having stored thereon instructions that, when executed by a machine, result in receiving at a User Equipment (UE) a cellular communication message from a node B of a Universal Mobile Telecommunications System (UMTS), the cellular communication message including a Wireless Local Area Network (WLAN) threshold value corresponding to a WLAN parameter; and determining a value of the WLAN parameter corresponding to a WLAN; controlling access network selection of the UE with respect to the WLAN based on the WLAN threshold value and the determined value of the WLAN parameter.

Example 125 includes the subject matter of Example 124, and optionally, wherein the WLAN threshold value comprises a load threshold value.

Example 126 includes the subject matter of Example 125, and optionally, wherein the instructions result in controlling access network selection of the UE based on the load threshold value and a load of the WLAN.

Example 127 includes the subject matter of Example 126, and optionally, wherein the instructions result in controlling access network selection of the UE based on a measured received signal strength indication (RSSI) measured by the UE with respect to the WLAN, an RSSI threshold, the load of the WLAN and the load threshold value.

Example 128 includes the subject matter of Example 127, and optionally, wherein the instructions result in controlling access network selection of the UE based on a ratio between a first difference between the measured RSSI and the RSSI threshold, and a second difference between the load of the WLAN and the load threshold value.

Example 129 includes the subject matter of Example 126, and optionally, wherein the instructions result in controlling access network selection of the UE based on a WLAN bandwidth of the WLAN, the load of the WLAN and the load threshold value.

Example 130 includes the subject matter of Example 129, and optionally, wherein the instructions result in selecting the WLAN when a product of the WLAN bandwidth of the WLAN and the load of the WLAN is greater than the load threshold value.

Example 131 includes the subject matter of Example 124, and optionally, wherein the WLAN threshold value comprises a Quality-of-Service (QoS) threshold value of a QoS class of the WLAN.

Example 132 includes the subject matter of Example 124, and optionally, wherein the WLAN threshold value comprises a network signal strength threshold of a WLAN signal strength.

Example 133 includes the subject matter of any one of Examples 124-132, and optionally, wherein the cellular communication message comprises a Radio-Resource Control (RRC) signaling message.

Example 134 includes the subject matter of any one of Examples 124-132, and optionally, wherein the cellular communication message comprises a System Information block (SIB).

Example 135 includes the subject matter of any one of any one of Examples 124-132, and optionally, wherein the instructions result in receiving the cellular communication message when the UE is at an Idle state.

Example 136 includes the subject matter of any one of any one of Examples 124-132, and optionally, wherein the instructions result in receiving the cellular communication message when the UE is at a connected state.

Example 137 includes a product including a non-transitory storage medium having stored thereon instructions that, when executed by a machine, result in receiving at a User Equipment (UE) a cellular communication message from a node B of a Universal Mobile Telecommunications System (UMTS), the cellular communication message including a Wireless Local Area Network (WLAN) offload Information Element (IE) including a cellular signal threshold value; and controlling traffic routing of the UE to a WLAN based on a comparison between a measured signal strength of the node B and the cellular signal threshold value.

Example 138 includes the subject matter of Example 137, and optionally, wherein the WLAN offload IE includes a plurality of cellular signal threshold values corresponding to a plurality of traffic types, and wherein the instructions result in controlling routing of traffic of the plurality of traffic types according to the plurality of cellular signal threshold values.

Example 139 includes the subject matter of Example 137 or 138, and optionally, wherein the cellular signal threshold value comprises a received signal code power (RSCP) threshold.

Example 140 includes the subject matter of Example 139, and optionally, wherein the instructions result in routing traffic to the node B if the measured signal strength of the node B is greater than the cellular signal threshold value.

Example 141 includes the subject matter of Example 139 or 140, and optionally, wherein the instructions result in routing traffic to the WLAN if the measured signal strength of the node B is equal to or lesser than the cellular signal threshold value.

Example 142 includes the subject matter of any one of Examples 137-141, and optionally, wherein the cellular communication message comprises a Radio-Resource Control (RRC) signaling message.

Example 143 includes the subject matter of any one of Examples 137-141, and optionally, wherein the cellular communication message comprises a System Information block (SIB).

Example 144 includes the subject matter of any one of any one of Examples 137-141, and optionally, wherein the instructions result in receiving the cellular communication message when the UE is at an Idle state.

Example 145 includes the subject matter of any one of any one of Examples 137-141, and optionally, wherein the instructions result in receiving the cellular communication message when the UE is at a connected state.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A user equipment (UE), comprising:
a wireless communication unit to receive, from a node B of a Universal Mobile Telecommunications System (UMTS), Wireless Local Area Network (WLAN) offload information including a WLAN offload threshold; and
a controller to control traffic steering from the UMTS to a WLAN at least in part based on a comparison between a measured signal strength value and the WLAN offload threshold.

2. The UE of claim 1, wherein the WLAN offload threshold comprises a received signal code power (RSCP) threshold of the UMTS, and the measured signal strength value is measured cellular signal strength.

3. The UE of claim 1, wherein the WLAN offload threshold comprises a WLAN received signal strength indication (RSSI) threshold, and the measured signal strength value is a measured RSSI value with regard to the WLAN.

4. The UE of claim 1, wherein if the WLAN offload information is received as a dedicated information element, then the UE is in a Forward Access Channel (CELL-FACH) state or a Dedicated Channel (CELL-DCH) state.

5. The UE of claim 1, wherein if the WLAN offload information is included in a system information block (SIB), then the UE is in a Cell Paging Channel (CELL_PCH) state, a UMTS Registration Area (URA) Paging Channel (URA_PCH) state, or a Forward Access Channel (CELL-FACH) state.

6. The UE of claim 1, wherein the WLAN offload threshold is at least a part of a system information block (SIB) message or a radio resource control (RRC) message.

7. The UE of claim 1, wherein the WLAN offload information is to be received from the node B via an upper layer.

8. The UE of claim 1, wherein the WLAN offload threshold comprises a load threshold value of a WLAN load.

9. A node B of a Universal Mobile Telecommunications System (UMTS), the node B comprising:
a wireless communication unit to transmit, to a user equipment (UE), Wireless Local Area Network (WLAN) offload information including a WLAN offload threshold to be used by the UE to steer traffic from the UMTS to a WLAN based on a signal strength value; and
a controller to control the wireless communication unit to transmit the WLAN offload information to the UE.

10. The node B of claim 9, wherein the WLAN offload threshold comprises a received signal code power (RSCP) threshold of the UMTS.

11. The node B of claim 9, wherein the WLAN offload threshold comprises a WLAN received signal strength indication (RSSI) threshold.

12. The node B of claim 9, wherein the wireless communication unit is to transmit the WLAN offload information when the UE is in a Forward Access Channel (CELL-FACH) state or a Dedicated Channel (CELL-DCH) state.

13. The node B of claim 9, wherein the wireless communication unit is to transmit the WLAN offload information when the UE is in a Cell Paging Channel (CELL_PCH) state, a UMTS Registration Area (URA) Paging Channel (URA_PCH) state, or a Forward Access Channel (CELL-FACH) state.

14. The node B of claim 9, wherein the WLAN offload threshold is at least a part of a system information block (SIB) message or a radio resource control (RRC) message.

15. The node B of claim 9, wherein the wireless communication unit is to transmit the WLAN offload information to the UE via an upper layer.

16. The node B of claim 9, wherein the WLAN offload threshold comprises a load threshold value of a WLAN load.

17. A user equipment (UE) to be used in a wireless network, the UE comprising:
one or more processors; and
one or more machine-readable medium having instructions stored thereon that, when executed by the one or more processors, cause the UE to:
receive, from a node B of a Universal Mobile Telecommunications System (UMTS), Wireless Local Area Network (WLAN) offload information including a WLAN offload threshold; and control traffic steering from the UMTS to a WLAN at least in part based on a comparison between a measured signal strength value and the WLAN offload threshold.

18. The UE of claim 17, wherein the WLAN offload threshold comprises a received signal code power (RSCP) threshold of the UMTS, and the measured signal strength value is measured cellular signal strength.

19. The UE of claim 17, wherein the WLAN offload threshold comprises a WLAN received signal strength indication (RSSI) threshold, and the measured signal strength value is a measured RSSI value with regard to the WLAN.

20. The UE of claim 17, wherein the WLAN offload information is to be received when the UE is in a Forward Access Channel (CELL-FACH) state or a Dedicated Channel (CELL-DCH) state.

21. The UE of claim 17, wherein the WLAN offload information is to be received when the UE is in a Forward Access Channel (CELL-FACH) state, a Cell Paging Channel (CELL_PCH) state, or a UMTS Registration Area (URA) Paging Channel (URA_PCH) state.

22. The UE of claim 17, wherein the WLAN offload threshold is at least a part of a system information block (SIB) message or a radio resource control (RRC) message.

23. A node B of a Universal Mobile Telecommunications System (UMTS), the node B comprising:
one or more processors; and
one or more machine-readable medium having instructions stored thereon that, when executed by the one or more processors, cause the node B to:
transmit, to a user equipment (UE), Wireless Local Area Network (WLAN) offload information including a WLAN offload threshold, to be used by the UE to steer traffic from the UMTS to a WLAN based on a signal strength value.

24. The node B of claim 23, wherein the WLAN offload threshold comprises a received signal code power (RSCP) threshold of the UMTS.

25. The node B of claim 23, wherein the WLAN offload threshold comprises a WLAN received signal strength indication (RSSI) threshold.

26. The node B of claim 23, wherein the WLAN offload threshold is at least a part of a system information block (SIB) message or a radio resource control (RRC) message.

* * * * *